(12) United States Patent
Vanwelden

(10) Patent No.: US 10,662,558 B2
(45) Date of Patent: May 26, 2020

(54) DOUBLE JERSEY KNITTED FABRIC WITH YARN SELECTION

(71) Applicant: LAVA BVBA, Wielsbeke (BE)

(72) Inventor: Johan Vanwelden, Wielsbeke (BE)

(73) Assignee: Lava BVBA, Wielsbeke (BE)

( * ) Notice: Subject to any disclaimer, the term of this patent is extended or adjusted under 35 U.S.C. 154(b) by 211 days.

(21) Appl. No.: 15/537,515

(22) PCT Filed: Dec. 18, 2015

(86) PCT No.: PCT/EP2015/080442
§ 371 (c)(1),
(2) Date: Jun. 19, 2017

(87) PCT Pub. No.: WO2016/097267
PCT Pub. Date: Jun. 23, 2016

(65) Prior Publication Data
US 2017/0362751 A1    Dec. 21, 2017

(30) Foreign Application Priority Data

Dec. 19, 2014 (BE) .................................. 2014/5133

(51) Int. Cl.
*D04B 1/10* (2006.01)
*D04B 9/38* (2006.01)
(Continued)

(52) U.S. Cl.
CPC ............. *D04B 1/102* (2013.01); *D04B 1/126* (2013.01); *D04B 9/38* (2013.01); *D04B 15/60* (2013.01);
(Continued)

(58) Field of Classification Search
CPC . D04B 1/102; D04B 9/26; D04B 9/28; D04B 9/30
See application file for complete search history.

(56) References Cited

U.S. PATENT DOCUMENTS

| | | |
|---|---|---|
| 1,769,856 A | 7/1930 | Page |
| 2,961,858 A | 11/1960 | Wiesinger |

(Continued)

FOREIGN PATENT DOCUMENTS

| | | |
|---|---|---|
| CN | 2853837 Y | 1/2007 |
| CN | 1958907 A | 5/2007 |

(Continued)

OTHER PUBLICATIONS

English translation of the Chinese Office Action in Chinese Application No. 201580076567.X, dated Nov. 2, 2018.
(Continued)

*Primary Examiner* — Danny Worrell
(74) *Attorney, Agent, or Firm* — Collard & Roe, P.C.

(57) ABSTRACT

A method for producing a double jersey fabric on a double jersey, single jacquard circular knitting machine includes steps of knitting a front side of the fabric on a cylinder (C) and knitting the rear side of the fabric on a dial (D) of the machine, knitting a base yarn on a rear side of the fabric, except for connecting points where the base yarn is knitted on the front side of the fabric. The method additionally includes steps of inserting a pattern yarn before a start of a pattern unit, which is produced using the pattern yarn, knitting the pattern yarn on the front side of the fabric in the pattern unit and cutting off the pattern yarn after the pattern unit.

9 Claims, 10 Drawing Sheets

(51) Int. Cl.
*D04B 1/12* (2006.01)
*D04B 15/60* (2006.01)

(52) U.S. Cl.
CPC ....... *D10B 2503/062* (2013.01); *Y02P 70/633* (2015.11)

(56) References Cited

U.S. PATENT DOCUMENTS

| | | | |
|---|---|---|---|
| 3,006,173 A | 10/1961 | Shoaf | |
| 3,990,268 A * | 11/1976 | Smith | D04B 1/02 |
| | | | 66/92 |
| 4,353,229 A * | 10/1982 | Hutchinson | D04B 1/102 |
| | | | 66/197 |
| 5,070,709 A * | 12/1991 | Guell | D04B 15/60 |
| | | | 66/140 R |
| 5,422,153 A * | 6/1995 | Miyamoto | D04B 21/02 |
| | | | 428/116 |
| 5,826,446 A * | 10/1998 | Plath | D04B 15/60 |
| | | | 66/140 R |
| 5,896,758 A * | 4/1999 | Rock | A43B 1/04 |
| | | | 66/191 |
| 5,943,883 A | 8/1999 | Plath et al. | |
| 6,058,742 A | 5/2000 | Dalmau Guell | |
| 7,536,879 B2 * | 5/2009 | Vanwelden | D04B 1/126 |
| | | | 66/19 |
| 7,611,999 B2 * | 11/2009 | McMurray | D04B 1/102 |
| | | | 442/304 |
| 7,845,196 B1 * | 12/2010 | Pai | D04B 15/61 |
| | | | 66/133 |
| 9,551,095 B2 * | 1/2017 | Lee | D04B 1/18 |
| 2004/0099016 A1 * | 5/2004 | Shepherd | D04B 1/126 |
| | | | 66/8 |
| 2008/0236204 A1 * | 10/2008 | Vanwelden | D04B 1/126 |
| | | | 66/17 |
| 2013/0152640 A1 * | 6/2013 | Kunde | D04B 1/104 |
| | | | 66/171 |
| 2017/0362751 A1 * | 12/2017 | Vanwelden | D04B 1/126 |

FOREIGN PATENT DOCUMENTS

| | | |
|---|---|---|
| CN | 200981914 Y | 11/2007 |
| EP | 1 975 294 | 10/2008 |
| FR | 2 343 846 | 10/1977 |
| GB | 727 394 | 3/1955 |
| TW | M383000 U | 6/2010 |

OTHER PUBLICATIONS

Klaus Peter Weber et al: "Wirkerei and Strickerei", Jan. 1, 2004, pp. 77-98, Frankfurt am Main, XP055196190, URL:http:/www.dfv-fachbuch.de (with English translation).

* cited by examiner

DOUBLE JERSEY KNITTED FABRIC WITH YARN SELECTION

CROSS-REFERENCE TO A RELATED APPLICATION

The invention described and claimed hereinbelow is a National Stage Application of PCT/EP2015/080442, filed on Dec. 18, 2015 (the PCT application), now filed in the United States under 35 USC § 371. The PCT application claims priority from Belgium Patent Application BE 2014/5133, filed on Dec. 19, 2014. The contents of the PCT application and the German Patent Application are incorporated by reference herein. The PCT application provides the basis for a claim for priority of invention.

BACKGROUND OF THE INVENTION

The present invention relates to a double jersey fabric, a method for producing a double jersey fabric, a circular knitting machine for knitting a double jersey knitted fabric, and the use of a circular knitting machine for producing a double jersey fabric. More particularly, the present invention relates to efficient use of material and improved productivity in the context of double jersey knitted fabrics by making use of yarn selection.

A double jersey knitted fabric (also referred to as double jersey knitwear) is a classic knitted fabric which is currently knitted on circular knitting machines. A double jersey circular knitting machine is generally provided with a cylinder and a dial, with the dial being positioned just above the cylinder. Generally, both the cylinder and the dial are each provided with needles. Usually, the needles of the cylinder are intended for knitting the "aesthetic" front side of the fabric and the needles of the dial are intended for knitting the "technical" rear side of the fabric. Filler or lay-in threads are often inserted between the front side and the rear side of the knitwear in order to add volume to the fabric. This is particularly useful when the double jersey knitwear is being used as mattress tick.

Often, a large variety of yarns is used in prior-art double jersey knitted fabrics. These yarns may be, for example, colourful, aesthetic yarns, but may also be mechanical yarns which are used for their specific mechanical properties, for example their elasticity, antistatic capacity and moisture-wicking capacity. In order to produce colour variations and variations in mechanical properties in various areas of a double jersey knitted fabric, not all yarns are knitted everywhere on the front side or the rear side of the double jersey knitted fabric. In those regions where a certain yarn is not knitted on the "aesthetic" front side of the fabric, the yarn is either knitted unnecessarily on the rear side of the fabric or the yarn floats and is inserted between the front and rear sides of the knitted fabric, optionally together with lay-in yarns.

However, inserting such yarns between the front side and rear side has the drawback that such floating yarns are difficult to control, in particular when they float across large distances. In order to overcome this challenge, these yarns may, as mentioned above, be anchored in a "technical" pattern on the non-visible, technical rear side of the double jersey knitted fabric. This technique is described in EP1975294. However, if the yarns are expensive and if the expensive yarn is only knitted in a small pattern on the front side, a large part of the yarn is wasted since only a small fraction of the yarn is visible. The present invention provides a cost-saving solution for this challenge without loss of quality.

Although the general technology (called plating) of inserting a pattern yarn before a certain pattern, and cutting said yarn after the pattern is completed is known for single Jersey fabrics such as socks, to our knowledge said technology has not been used to produce double Jersey fabrics. Although yarn selectors such as stripers are well known in the circular knitting field, they have to our knowledge never been used on double jacquard circular knitting machines, to select and deselect yarns to be knitted in a pattern on a double Jersey fabric.

OBJECTS AND SUMMARY OF THE INVENTION

In one aspect, the present invention comprises a method for knitting a double jersey knitted fabric (100) on a double jersey, single jacquard circular knitting machine:
which has a front side (600) and a rear side (500);
which comprises one or more base yarns (308) which are substantially knitted on the rear side (500), except for a few connecting points which are knitted on the front side (600);
which comprises one or more pattern yarns (302, 304 or 306);
characterized in that
the abovementioned pattern yarn is inserted before the start of a pattern unit (400) which is produced using the respective pattern yarn (302, 304 or 306);
said pattern yarn is subsequently knitted on the front side (600) of the fabric in the pattern unit (400);
said pattern yarn is cut off after the pattern unit.

In a further aspect, the present invention comprises a method for knitting a double jersey knitted fabric (100):
which has a front side (600) and a rear side (500);
which comprises one or more base yarns (308) which are substantially knitted on the rear side (500), except for a few connecting points which are knitted on the front side (600);
which comprises one or more pattern yarns (302, 304 or 306);
which is knitted on a double jersey, double jacquard circular knitting machine which has a cylinder (C) and a dial (D), in which the needles of the cylinder (C) are intended for knitting the front side (F) of the fabric and the needles of the dial (D) are intended for knitting the rear side (B) of the fabric;
characterized in that
the abovementioned pattern yarn (302, 304 or 306) is inserted at a position of 1 to 50, preferably 1 to 20, more preferably 1 to 10 and most preferably 1, 2, or 3 stitches before the start of a pattern unit (400) which is produced using the respective yarn (302, 304 or 306) and is knitted on the rear side of the fabric (100) before the start of the pattern unit (400) for the abovementioned number of stitches;
said pattern yarn is subsequently knitted on the front side (600) of the fabric in the pattern unit (400);
said pattern yarn is knitted on the rear side (500) of the fabric (100) after the pattern unit (400) for 1 to 50, preferably 1 to 20, more preferably 1 to 10 and most preferably 1, 2 or 3 stitches after the end of a pattern unit (400); and
said pattern yarn (302, 304 or 306) is subsequently cut off.

In a further aspect, the present invention comprises a method for knitting a double jersey knitted fabric on a double jacquard circular knitting machine:
- which has a front side and a rear side;
- which comprises one or more mechanical yarns which are knitted on the rear side and/or on the front side of the fabric;

characterized in that
- the abovementioned mechanical yarn (310) is inserted at a position of 1 to 50, preferably 1 to 20, more preferably 1 to 10 and most preferably 1, 2 or 3 stitches before the start of a mechanical unit (900) or a mechanical pattern which is produced using the respective mechanical yarn;
- said mechanical yarn (310) is knitted on the rear side of the fabric before the start of the mechanical unit (900) with the abovementioned number of stitches, together with a second yarn (e.g. another mechanical yarn or a base yarn) which was used to produce a preceding mechanical unit;
- said mechanical yarn (310) in the mechanical unit (900) is knitted on the rear side and/or on the front side of the fabric;
- said mechanical yarn (310) is knitted on the rear side of the fabric after the mechanical unit (900) which was produced using the respective mechanical yarn for 1 to 50, preferably 1 to 20, more preferably 1 to 10 and most preferably 1, 2 or 3 stitches, together with the yarn (e.g. base yarn 308) which is used to produce a subsequent mechanical unit (902); and
- said mechanical yarn (310) is subsequently cut off.

In a further aspect, the present invention comprises a double jersey knitted fabric
- which has a front side and a rear side;
- which comprises one or more base yarns which are knitted both on the front side and on the rear side;
- which comprises one or more pattern yarns;

characterized in that
- the pattern yarn is inserted at a position of 1 to 50, preferably 1 to 20, more preferably 1 to 10 and most preferably 1, 2 or 3 stitches before the start of a pattern unit which is produced using the respective yarn and is knitted on the rear side of the fabric before the start of the pattern unit for the abovementioned number of stitches;
- said pattern yarn is subsequently knitted in a pattern unit on the front side of the fabric;
- said pattern yarn is knitted after on the rear side of the fabric a pattern unit for 1 to 50, preferably 1 to 20, more preferably 1 to 10 and most preferably 1, 2 or 3 stitches after the end of a pattern unit; and
- said pattern yarn is subsequently cut off.

In a further aspect, the present invention comprises a double jersey, double jacquard circular knitting machine
- which comprises a cylinder (C) and a dial (D);
- which is provided with one or more yarn selection mechanisms;

in which the double jersey, double jacquard circular knitting machine is suitable for knitting a double jersey knitted fabric as described herein. Such a knitting machine comprises a cylinder and a dial provided with needles each separately driven by an electronical pattern controlling mechanism (also called jacquard mechanism), wherein the needles of the cylinder are provided for knitting the front of the fabric, and the needles of the dial are provided for knitting the back of the fabric. Said knitting machine is more particularly suited for knitting a double jersey knitted fabric which has a front side and a rear side; which comprises one or more base yarns which may be knitted both on the front side and on the rear side; which comprises one or more pattern yarns; in which the pattern yarn is inserted at a position of 1 to 50, preferably 1 to 20, more preferably 1 to 10 and most preferably 1, 2 or 3 stitches before the start of a pattern unit which is produced using the respective yarn and is knitted on the rear side of the fabric before the start of the pattern unit for the abovementioned number of stitches; in which said pattern yarn is subsequently knitted on the front side of the fabric in the pattern unit; in which said pattern yarn is knitted on the rear side of the fabric after the pattern unit for 1 to 50, preferably 1 to 20, more preferably 1 to 10 and most preferably 1, 2 or 3 stitches after the end of the pattern unit; and in which said pattern yarn is subsequently cut off; said machine being characterized in that:
- each yarn selection mechanism is provided with a yarn-cutting device;
- each yarn selection mechanism is configured to be able to perform a yarn change at any position in the double jersey knitted fabric.

In a further aspect, the present invention comprises a double jersey, single jacquard circular knitting machine
- which comprises a cylinder (C) and a dial (D)
- which is provided with one or more yarn selection mechanisms which is suitable for knitting a double jersey knitted fabric as described herein and more particularly for knitting a double jersey knitted fabric which has a front side (600) and a rear side (500); which comprises one or more base yarns (308) which are knitted on the rear side (500) except for some connecting points (240, 242) which are knitted on the front side (600); which comprises one or more pattern yarns (302, 304, 306); in which an abovementioned pattern yarn is inserted before the start of a pattern unit (400) which is produced using the respective yarn (302, 304, 306); in which the said pattern yarn is subsequently knitted on the front side (600) of the fabric in the pattern unit (400); in which said pattern yarn is cut off after the pattern unit;

characterized in that:
- each yarn selection mechanism is provided with a yarn-cutting device;
- each yarn selection mechanism is configured to be able to perform a yarn change at any position in the double jersey knitted fabric.

The invention hence provides in the following items:

Item 1: A method for knitting a double jersey knitted fabric (100) on a double jersey, single jacquard circular knitting machine, wherein the fabric has a front side (600) and a rear side (500), comprising the following steps;
- knitting the front side (600) of the fabric (100) on the cylinder (C) and knitting the rear side (500) of the fabric (100) on the dial (D) of said machine;
- knitting a base yarn (308) on the rear side (500) of the fabric (100), except for connecting points (240, 242) where the base yarn (308) is knitted on the front side (600) of the fabric (100); characterized in that the method comprises the following additional steps:
- inserting a pattern yarn (302) before the start of a pattern unit (400) which is produced using the respective pattern yarn (302);
- knitting the pattern yarn (302) on the front side (600) of the fabric in the pattern unit (400);
- cutting off the pattern yarn (302) after the pattern unit (400).

In this way, a saving in expensive pattern yarns is achieved without loss of quality of the knitted fabric.

The term "double jersey knitted fabric" or "double jersey knitwear", as used herein, is defined as a knitted fabric which is knitted on a circular knitting machine, in which the circular knitting machine is provided with a cylinder and a dial which is situated just above the cylinder. Both the cylinder and the dial are provided with needles. The needles of the cylinder are intended for knitting the front side of the fabric. The needles of the dial are intended for knitting the rear side of the fabric. A double jersey knitted fabric comprises one or more yarns which are knitted on both the front side of the knitted fabric and on the rear side of the knitted fabric, thus forming a connection between the front and rear side of the knitted fabric. Usually, filler threads are added between the dial and the cylinder to add volume to the double jersey knitted fabric, for example when the double jersey knitted fabric is used as mattress tick, but this is not compulsory.

The term "base yarn", as used herein, refers to the yarns which are typically used for the technical rear side of the fabric or the knitted fabric. They are strong threads which form the basis of the knitted fabric and on which the patterns are recorded.

The term "binding yarn", as used herein, refers to a yarn which is inserted to anchor loose threads. Often, the binding yarn is slightly thinner than normal base or pattern yarn and is knitted together with these yarns in order to reinforce the transition zone between two types of yarns in successive patterns.

The term "stitch", as used herein, may also refer to a tuck stitch (French: "une charge"). Tuck stitches may be used in particular to anchor pattern yarns on the rear side of a knitted fabric. However, anchoring by means of tuck stitches is less efficient than anchoring by means of stitches; tuck stitches are less well fixed than stitches. This may be remedied, for example, by using a larger number of anchoring points when using tuck stitches compared to using stitches for anchoring.

The term "front side" of a double jersey knitted fabric is understood to refer to the aesthetic side of the knitted fabric which is visible to the user during normal use.

The term "rear side" of a double jersey knitted fabric is understood to refer to the technical side of the knitted fabric which is invisible to a user during normal use, but which gives the fabric the desired mechanical properties.

The term "pattern unit" is understood to mean a piece of a double jersey knitted fabric in which a certain pattern yarn is knitted on the front side of the fabric. The term "pattern yarn" refers to a yarn which is used to form a pattern in the knitted fabric. This may be a colour pattern or a pattern having a different quality, having a different feel or a different thickness. Usually, the pattern yarn is a yarn of a relatively expensive quality. If reference is made to one pattern unit in the aspects and claims, then this obviously does not exclude the presence of further identical or different pattern units in the fabric.

The term "pattern unit" also includes the term "mechanical unit" which forms a pattern made with a mechanical yarn which imparts certain mechanical properties to the fabric.

The term "mechanical yarn" is understood to mean a yarn which imparts a certain mechanical property to the knitted fabric. Examples are elastic, antistatic or moisture-wicking yarns. Pattern units or mechanical units may thus also be made of yarns which impart a different property to the knitted fabric, for example antistatic or moisture-wicking yarns for knitting antistatic pattern units or moisture-wicking yarns for use in certain zones of the mattress tick. One knitted fabric may comprise different pattern units. Pattern units and/or mechanical units may alternate and/or repeat.

The term "double jersey, single jacquard circular knitting machine" is understood to mean a circular knitting machine which is suitable for knitting double jersey fabrics and which comprises a single needle selection mechanism.

Item 2: A method for knitting a double jersey knitted fabric on a double jersey, single jacquard circular knitting machine, wherein the fabric has a front side (600) and a rear side (500), comprising the steps of:

knitting the front side (600) of the fabric (100) on the cylinder (C) and knitting the rear side (500) of the fabric (100) on the dial (D) of the machine;

knitting a base yarn (308) on the rear side (500) of the fabric (100), except for connecting points (240, 242) where the base yarn (308) is knitted on the front side of the fabric;

characterized in that the method additionally comprises the following steps:

Inserting a pattern yarn (304) before the start of a pattern unit (400) which is produced using the respective yarn (304);

knitting the pattern yarn (304) on both the front side (600) and the rear side (500) of the fabric in the pattern unit (400);

cutting off the pattern yarn (304) after the pattern unit (400) which is produced using said yarn.

In this way, a saving in expensive pattern yarns is achieved without the loss of quality of the knitted fabric.

Item 3: A method for knitting a double jersey knitted fabric on a double jersey, single jacquard circular knitting machine, wherein the fabric has a front side (600) and a rear side (500), a first pattern yarn (302), a second pattern yarn (304) and a third pattern yarn (306), comprising the following steps:

knitting the front side (600) of the fabric (100) on the cylinder (C) and knitting the rear side (500) of the fabric (100) on the dial (D) of said machine;

knitting a base yarn (308) on the rear side (500) of the fabric (100), except for connecting points (240, 242) wherein the base yarn (308) is knitted on the front side of the fabric;

characterized in that the method further comprises the steps of:

knitting a first pattern yarn (302) only on the front side (600) of the fabric in a first pattern unit (400) produced using said first pattern yarn (302);

having the first pattern yarn (302) floating between the front side (600) and the rear side (500) of the fabric in the zones which are not produced using the first pattern yarn (302), in particular a second pattern unit (401) preceding the first pattern unit (400) and a third pattern unit (402) following the first pattern unit (400); or inserting the first pattern yarn (302) before the first pattern unit (400) which is produced using the first pattern yarn (302), knitting said first pattern yarn (302) on the front side in the first pattern unit (400), and cutting off said first pattern yarn (302) after said first pattern unit;

inserting a second pattern yarn (304) before the second pattern unit (401) which is produced using the second pattern yarn (304);

knitting the second pattern yarn (304) on both the front side (600) and the rear side (500) of the fabric in the second pattern unit (401);

knitting the second pattern yarn (304) on the rear side (500) of the fabric (100) in the first pattern unit (400);

knitting the second pattern yarn (304) on both the front side (600) and on the rear side (500) of the fabric (100) in the third pattern unit (402);

cutting off the second pattern yarn (304) after the third pattern unit (402);

knitting a third pattern yarn (306) in an identical manner to the first pattern yarn (302).

In this way, a saving in expensive pattern yarns is achieved without loss of quality of the knitted fabric.

In some embodiments, the pattern yarns are secured in the fabric by the base yarn. As the single Jacquard circular knitting machine does not allow automatic selection of the needles in the dial, the pattern yarn cannot be secured by means of a few stitches on the rear side of the fabric. By increasing the length of the ends of the pattern yarn slightly, for example from 1 cm to approximately 2.5 or 5 cm, these will be secured in the knitted fabric by means of friction with the rest of the fabric.

In some embodiments, the pattern yarns (302, 304, 306) are secured specifically at the start and end of a pattern unit (400) by means of one or more stitches (240) on the front side of the fabric using a base yarn (308). A specific embodiment of this concept is illustrated in FIG. 7 and is described in one of the specific embodiments which have been added at the end of this document.

Item 4: The method according to any one of items 1 to 3, in which, in addition, a binding yarn (312) is knitted in on the cylinder (C), together with the respective pattern yarns (302, 304, 306) on the front side (600) of the fabric (100).

In this way, a saving in expensive pattern yarns is achieved, without loss of quality of the knitted fabric.

The length and the loose ends and the number of stitches with which the binding yarn is knitted together with the pattern yarn is determined by means of an assessment between costs and strength of the mechanical anchoring.

A large number of stitches increases the strength of the mechanical anchoring, but also increases the costs. In general, a relatively low number of connecting stitches is preferred, for example fewer than five stitches, because this already provides sufficient mechanical anchoring at low costs. However, when anchoring, for example, very smooth yarns, a larger number of stitches may be optimum.

Long loose ends may also benefit the mechanical anchoring. However, an assessment also has to be made of the costs and the strength of the mechanical anchoring. In addition, there is a risk of the loose ends showing through the front side of the knitted fabric if highly contrasting colours are used. It is therefore preferred to use relatively short ends in the case of highly contrasting colours.

In a further embodiment, the present invention describes the method as described in one of the items 1 to 3, in which, in addition, a binding yarn (312) is knitted in on the cylinder (C), together with the respective pattern yarns (302, 304, 306) on the front side (600) of the fabric (100).

Alternatively, the binding yarn (312) may be knitted in completely with the pattern yarn (302) in the pattern unit, thus obtaining a method according to item 4, characterized in that:

a binding yarn is inserted at a position of 1 to 50, preferably 1 to 20, more preferably 1 to 10 and most preferably 1, 2 or 3 stitches before the start of a pattern unit;

the binding yarn is knitted on the front side of the fabric before the start of the pattern unit for the abovementioned number of stitches, together with the yarn which is knitted on the front side of the fabric before the start of the pattern unit;

the binding yarn is knitted on the front side of the fabric after the start of the pattern unit, together with the yarn which is knitted on the front side of the fabric in said pattern unit;

the binding yarn is knitted on the front side of the fabric after the end of the pattern unit for the abovementioned number of stitches, together with the yarn which is knitted on the front side of the fabric after the end of said pattern unit;

the binding yarn is subsequently cut off;

so that the loose ends of the binding yarns are 0.1 to 5 cm long, are preferably 0.5 cm to 2.5 cm long, and are most preferably approximately 1 cm long.

Connecting pattern yarns and binding yarns together by knitting is currently done by means of plating technology (French: vanisage). In this way, pattern units on the front side of a double jersey knitted fabric are connected to one another. In an analogous manner, mechanical yarns of different mechanical units can be connected to each other by means of binding yarns.

In this way, the yarns which are used to produce adjacent pattern units are efficiently anchored to one another at the transition between the respective pattern units.

Item 5: A method for knitting a double jersey knitted fabric (100) on a double jersey, single jacquard circular knitting machine, wherein said fabric has a front side (600) and a rear side (500) and comprises a first pattern yarn (302), a second pattern yarn (304) and a binding yarn (312), comprising the steps of:

knitting the front side (600) of the fabric (100) on the cylinder (C) and knitting the rear side (500) of the fabric (100) on the dial (D) of said machine;

knitting a base yarn (308) on the rear side (500) of the fabric (100), except for connecting points (240) wherein the base yarn (308) is knitted on the front side (600) of the fabric (100);

characterized in that the method further comprises the steps of:

inserting the binding yarn (312) at a position of 1 to 50, preferably 1 to 20, more preferably 1 to 10 and most preferably 1, 2 or 3 stitches before the start of a first pattern unit (400);

knitting the binding yarn (312) on the front side of the fabric before the start of the first pattern unit (400) for the abovementioned number of stitches, together with the first pattern yarn (302) which is knitted on the front side (600) of the fabric (100) before the start of the first pattern unit (400) in a preceding pattern unit (401);

inserting the first pattern yarn (302) at the start of the first pattern unit (400) and cutting off the second pattern yarn (304);

knitting the binding yarn (312) on the front side (600) of the fabric (100) after the start of the first pattern unit (400), together with the second pattern yarn (304) which is knitted on the front side of the fabric in the preceding pattern unit (401);

knitting the binding yarn (312) on the front side of the fabric after the end of the first pattern unit (400) for the abovementioned number of stitches, together with the first pattern yarn (304) which is knitted (400) on the front side (600) of the fabric (100) after the end of first pattern unit;

Cutting off the binding yarn (312), such that the loose ends of the binding yarn (312) are 0.1 to 5 cm long, are preferably 0.5 cm to 2.5 cm long, and are most preferably approximately 1 cm long.

Item 6: A method for knitting a double jersey knitted fabric (100) having a front side (600) and a rear side (500) and comprises a base yarn (308, a first pattern yarn (302) and, optionally, a second pattern yarn (304) and a third pattern yarn (306), on a double jersey, double jacquard circular knitting machine which has a cylinder (C) and a dial (D), in which the needles of the cylinder (C) are intended for knitting the front side (F) of the fabric and the needles of the dial (D) are intended for knitting the rear side (B) of the fabric, said method comprising the steps of:
- knitting the base yarn (308) on the rear side (500) of the fabric (100), except for connecting points (240) where the base yarn (308) is knitted on the front side (600) of the fabric (100);

characterized in that:
- the first pattern yarn (302) is inserted at a position of 1 to 50, preferably 1 to 20, more preferably 1 to 10 and most preferably 1, 2 or 3 stitches before the start of a pattern unit (400) which is produced using the respective first pattern yarn (302) and is knitted on the rear side of the fabric (100) before the start of the pattern unit (400) for the abovementioned number of stitches;
- the first pattern yarn (302) is subsequently knitted on the front side (600) of the fabric in the pattern unit (400);
- the first pattern yarn (302) is knitted on the rear side (500) of the fabric (100) after the pattern unit (400) for 1 to 50, preferably 1 to 20, more preferably 1 to 10 and most preferably 1, 2 or 3 stitches after the end of a pattern unit (400); and
- the first pattern yarn (302) is subsequently cut off;
- optionally, the second pattern yarn (304) and the third pattern yarn (306) are knitted in a similar manner in and around the pattern units which are produced using these respective yarns as described for the first pattern yarn (302).

In this way, a significant amount of expensive pattern yarn is saved, for example compared to the method described in EP1975294, because the expensive yarns are only knitted in a pattern unit and in the immediate vicinity of a pattern unit.

Cutting off binding yarns and pattern or mechanical yarns as mentioned in the method described herein may be effected by any cutting device. Preferably, such cutting devices are composed of a clamping unit which retains the yarn to be cut and of a cutting unit which cuts the yarn. Examples are known from the field of circular knitting machines.

The insertion of binding yarns, pattern yarns or mechanical yarns may be effected by so-called yarn selection mechanisms or yarn selectors (also known as stripers or yarn fingers). These finger-like devices introduce the yarn into the knitting system in such a manner and at the appropriate time that the yarn can be gripped by the needles of the dial for knitting. This process is also referred to as feeding the yarn. Examples are generally known from the field of the circular knitting machines.

In the paragraphs below, the operation of the cutting device and the yarn selector is illustrated for pattern yarns and mechanical yarns. The operation is identical for binding yarns, mutatis mutandis. As a non-limiting example the operation of the cutting device and the yarn selector for pattern or mechanical yarns is adjusted with respect to each other as follows:

1) the pattern or mechanical yarn is fed to the needles by the respective yarn selector at a position of 1 to 50, preferably 1 to 20, more preferably 1 to 10 and most preferably 1, 2 or 3 stitches before the start of the pattern unit, following which the yarn is first knitted in on the rear side of the fabric by the needles of the dial for the number of stitches mentioned, following which the yarn is knitted in by the needles of the cylinder on the front side of the fabric to form the pattern unit, and finally, the yarn is again knitted in by the needles of the dial on the rear side of the fabric for the number of stitches mentioned. Providing or feeding the yarns by the yarn selector may also be assisted by the clamping unit or the cutting device which may clamp the yarn before it is inserted and subsequently immediately release it, as soon as the yarn has been caught by the needles of the dial;

2) the yarn is subsequently taken to the cutting device by the yarn selector and the yarn is clamped by the clamping unit and cut off by the cutting unit. Typically, this produces a loose end having a length of approximately 0.1 to 5 cm, preferably 0.5 cm to 2.5 cm, and most preferably approximately 1 cm, which is inserted between the knitted fabrics of the front and rear side.

Item 7: The method according to any one of items 1 to 6, characterized in that the knitting process uses at least one pattern unit comprising more than 12 needles.

By using more than 12 needles, it is possible to knit large pattern units.

Item 8: The method according to any one of items 1 to 7, characterized in that the fabric is a non-reversible single-sided knitted fabric wherein the desired design is knitted on the front side of the fabric.

Double jersey knitted fabrics according to the present invention have a front side and a rear side. By using the rear side as the technical side and the front side as the aesthetic side with a desired design, it is possible to produce a plurality of effects. Thus, for example, an area with relief fabric can be created by knitting an elastic yarn at relatively high tension on the rear side and a non-elastic yarn at relatively low tension on the front side.

Item 9: The method according to any one of items 1 to 8, in which the design of the front side (F) of the fabric which is knitted comprises at least one area of relief fabric.

In mattress ticks, relief fabric is currently being used to produce a decorative pattern. In addition, the relatively voluminous enclosed space in an area of relief fabric makes it soft to the touch and ensures improved ventilation.

Item 10: The method according to any one of items 1 to 9, characterized in that the loose ends (830, 832) of yarns are 0.1 to 5 cm long, are preferably 0.5 cm to 2.5 cm long and are most preferably approximately 1 cm long.

The loose ends of the pattern yarns have to have a minimum length, for example of approximately 0.1 cm, to ensure that the yarns are sufficiently anchored in the fabric. By contrast, the loose ends of the yarns are most preferably not too long, for example less than approximately 5 cm, in order to prevent wasting yarn and to prevent anything from showing through on the front side of the fabric. Loose ends having a length of preferably 0.5 cm to 2.5 cm, preferably of approximately 1 cm, are a good compromise between anchoring and preventing anything from showing through or wasting yarn.

Item 11: The method according to any one of items 1 to 10, characterized in that the fabric is provided with one or more filler threads which are inserted between the front side and the rear side of the double jersey knitted fabric.

These filler threads give volume to the space between the front and rear side of the double jersey knitted fabric, which renders the fabric more luxurious to the touch and makes it slightly softer. In addition, it benefits the ventilating properties of the fabric and gives the fabric a relief effect.

Item 12: The method according to any one of items 1 to 11, characterized in that the loose ends (830, 832) of yarns are inserted between the rear side (500) and the front side (600) of the knitted fabric.

Positioning the loose ends (820, 822) in this way may be advantageous when it is undesirable for the loose ends (820, 822) to protrude from the rear side (500) of the fabric (100). This may be the case, for example, when the rear side (500) is subjected to a considerable shear load. If such a shear load acts on the loose ends (820, 822), the fabric (100) might become damaged. In addition, the loose ends are generally not visible, or hardly at all, on the front side or rear side of the finished fabric in this way.

Surprisingly, the inventors have discovered that a method according to the present invention is highly suitable for knitting mattress ticks:

Item 13: The invention hence encompasses a method according to any one of items 1 to 12 for knitting a mattress tick.

Item 14: The invention further encompasses a fabric produced by the method according to any one of items 1 to 13.

In some embodiments, the fabric comprises more than two pattern yarns.

By using, for example, several yarns with different colours, it is, for example, possible to produce colourful patterns in the fabric.

Item 15: A method for knitting a double jersey knitted fabric on a double jacquard circular knitting machine, wherein said fabric has a front side (600) and a rear side (500), and comprises a base yarn (308), a mechanical yarn (310), and a pattern yarn (302);
characterized in that it comprises the following steps:
  knitting the pattern yarn (302) on the front side (600) of the fabric;
  inserting the mechanical yarn (312) at a position of 1 to 50, preferably 1 to 20, more preferably 1 to 10 and most preferably 1, 2 or 3 stitches before the start of a mechanical unit (900) which is produced using the respective mechanical yarn;
  knitting the mechanical yarn (362) on the rear side of the fabric before the start of the mechanical unit (900) with the abovementioned number of stitches, together with the base yarn (308);
  knitting the mechanical yarn (312) on the rear side of the fabric in the mechanical unit (900), except for connecting points where it is knitted on the front side of the fabric;
  knitting the mechanical yarn (312) on the rear side of the fabric after the mechanical unit (900) which is produced using the respective mechanical yarn for 1 to 50, preferably 1 to 20, more preferably 1 to 10 and most preferably 1, 2 or 3 stitches, together with the base yarn (308); and
  subsequently cutting off the mechanical yarn (312).

By using mechanical yarns on the rear side of the fabric, it is for example possible to introduce variations in elasticity. Knitting mechanical yarns only locally can result in a significant cost saving, since such yarns are, for example, only required in well-defined locations in the mattress tick. Thus, the mechanical yarns may be provided in a well-defined zone in order to support, for example, the shoulder or hip. With such a system, a base yarn is alternated with a mechanical yarn on the dial, with both yarns together completing one line and overlapping in, for example, 1 to 50, preferably 1 to 20, more preferably 1 to 10 and most preferably 1, 2 or 3 stitches.

Item 16: The method according to item 15, which further comprises knitting with a second pattern yarn (304), in which:
  the second pattern yarn (304) is inserted at a position of 1 to 50, preferably 1 to 20, more preferably 1 to 10 and most preferably 1, 2 or 3 stitches before the start of a pattern unit (400) which is produced using the respective second pattern yarn (304) and is knitted on the rear side of the fabric before the start of the pattern unit (400) for the abovementioned number of stitches;
  the second pattern yarn (304) is subsequently knitted on the front side of the fabric in the pattern unit (400);
  the second pattern yarn (304) is knitted on the rear side of the fabric after the pattern unit (400) for 1 to 50, preferably 1 to 20, more preferably 1 to 10 and most preferably 1, 2 or 3 stitches after the end of the pattern unit;
  the second pattern yarn (304) is subsequently cut off.

In this way, a considerable amount of expensive pattern yarn is saved, for example compared to the known methods such as for example described in EP1975294, because expensive pattern yarns are only knitted in a pattern unit and in the immediate vicinity of a pattern unit.

Item 17: The method according to any one of items 15 to 16, characterized in that the knitting process uses a pattern unit and/or a mechanical unit which comprises more than 12 needles, making it possible to knit large designs.

Item 18: The method according to any one of items 15 to 17, characterized in that the fabric is a non-reversible single-sided knitted fabric wherein the desired design is knitted on the front side of the fabric.

Double jersey knitted fabrics according to the present invention have a front side and a rear side. By using the rear side as the technical side and the front side as the aesthetic side with a desired design, it is possible to produce a plurality of effects. Thus, for example, an area of relief fabric may be created by knitting an elastic yarn under tension on the rear side and a non-elastic yarn which is not under tension on the front side.

Item 19: The method according to any one of items 15 to 18, in which the design of the front side (F) of the fabric comprises at least one area of relief fabric.

In mattress ticks, relief fabric may be used to form a decorative pattern. In addition, the relatively voluminous enclosed space in an area of relief fabric makes it soft to the touch and ensures improved ventilation.

Item 20: The method according to any one of items 15 to 19, characterized in that the loose ends are 0.1 to 5 cm long, are preferably 0.5 cm to 2.5 cm long and are most preferably approximately 1 cm long.

The loose ends of the mechanical yarns have to have a minimum length, approximately 0.1 cm, to ensure that the yarns are sufficiently anchored in the fabric. On the other hand, the loose ends of the yarns are most preferably not too long, i.e. less than approximately 5 cm, in order to prevent wasting yarn and to prevent anything from showing through. Loose ends of approximately 1 cm are a good compromise between anchoring and preventing anything from showing through or wasting yarn.

The loose ends of the pattern yarns also have to have a minimum length, approximately 0.1 cm, to ensure that the yarns are sufficiently anchored in the fabric. On the other hand, the loose ends of the yarns are most preferably not too long, i.e. less than approximately 5 cm, in order to prevent wasting yarn and to prevent anything from showing through.

Loose ends of approximately 1 cm are a good compromise between anchoring and preventing anything from showing through or wasting yarn.

Item 21: The method according to any one of items 15 to 20, characterized in that the fabric is provided with one or more filler threads which are inserted between the front side and the rear side of the double jersey knitted fabric.

These filler threads give volume to the space between the front and rear side of the double jersey knitted fabric which makes the fabric more luxurious to the touch and makes it slightly softer. In addition, it benefits the ventilating properties of the fabric and gives the fabric a relief effect.

Item 22: In an embodiment, the method is characterized in that the loose ends are inserted between the rear side and the front side of the knitted fabric. Positioning the loose ends (820, 822) in this way may be advantageous when it is undesirable for the loose ends (820, 822) to protrude from the rear side (500) of the fabric (100). This may be the case, for example, when the rear side (500) is subjected to a considerable shear load. If such a shear load acts on the loose ends (820, 822), the fabric (100) might become damaged. In addition, the loose ends are generally not visible, or hardly at all, on the front side or rear side of the finished fabric in this way.

Item 23: The method according to any one of items 15 to 22 for knitting a mattress tick.

Item 24: A fabric produced by the method according to any one of items 15 to 23.

In some embodiments, the fabric comprises more than one pattern yarn and/or more than one mechanical yarn.

By using several mechanical yarns, it is possible to produce a fabric in which different locations on the rear side have different mechanical properties. Thus, for example, a fabric may be obtained in which the elasticity of the rear side varies from location to location.

In some embodiments, the fabric is provided with one or more filler threads which are used as filler threads between the front side and the rear side of the double jersey knitted fabric.

These filler threads give volume to the space between the front and rear side of the double jersey knitted fabric which renders the fabric more luxurious to the touch and also makes it softer. In addition, it benefits the insulating properties of the fabric.

Item 25: The present invention also provides a double jersey knitted fabric (100):
which has a front side (600) and a rear side (500);
in which the fabric comprises a base yarn (308) which is knitted on the rear side (500) of the fabric (100), except for connecting points (240, 242) where the pattern yarn (308) is killed on the front side (600) of the fabric (100);
characterized in that the fabric comprises a pattern yarn (302), in which:
the pattern yarn (302) is inserted before the start of a pattern unit (401) which is produced using the pattern yarn (302);
the pattern yarn (302) is knitted on the front side (600) of the fabric in the pattern unit which is produced using said yarn (400);
the pattern yarn (302) is cut off after the pattern unit (400) produced using said yarn (302).

Item 26: A double jersey knitted fabric:
in which the fabric has a front side (600) and a rear side (500);
in which the fabric comprises a base yarn (308) which is knitted on the rear side (500) of the fabric (100), except for connecting points (240, 242) where the base yarn (308) is knitted on the front side of the fabric;
characterized in that the fabric comprises a pattern yarn (304), in which:
the pattern yarn (304) is inserted before the start of a pattern unit (400) which is produced using the respective yarn (304);
the pattern yarn (304) is knitted on both the front side (600) and the rear side (500) of the fabric in the pattern unit (400);
the pattern yarn (304) is cut off after the pattern unit (400) produced using said yarn.

Item 27: A double jersey knitted fabric:
which has a front side (600) and a rear side (500);
in which the fabric comprises a base yarn (308) which is knitted on the rear side (500) of the fabric (100), except for connecting points (240, 242) where the base yarn (308) is knitted on the front side of the fabric;
characterized in that the fabric comprises a first pattern yarn (302), a second pattern yarn (304), and a third pattern yarn (306), in which:
the first pattern yarn (302) is only knitted on the front side (600) of the fabric in a first pattern unit (400) produced using the first pattern yarn (302);
wherein the first pattern yarn (302):
either floats between the front side (600) and the rear side (500) of the fabric in the zones which are not produced using the first pattern yarn (302), in particular a second pattern unit (401) preceding the first pattern unit (400) and a third pattern unit (402) following the first pattern unit (400); or
is inserted before the first pattern unit (400) which is produced using the first pattern yarn (302), is knitted on the front side in the first pattern unit (400), and is cut off after the first pattern unit;
the second pattern yarn (304) is inserted before the first pattern unit (401) which is produced using the second pattern yarn (304);
the second pattern yarn (304) is knitted on both the front side (600) and the rear side (500) of the fabric in the second pattern unit (401);
the second pattern yarn (304) is knitted on the rear side (500) of the fabric (100) in the first pattern unit (400);
the second pattern yarn (304) is knitted on both the front side (600) and on the rear side (500) of the fabric (100) in the third pattern unit (402);
the second pattern yarn (304) is cut off after the third pattern unit (402);
the third pattern yarn (306) is knitted in an identical manner to the first pattern yarn (302).

Item 28: The double jersey knitted fabric (100) according to any of items 25 to 27, in which, in addition, a binding yarn (312) is knitted in together with the respective pattern yarns (302, 304, 306) on the front side (600) of the fabric (100).

Item 29: A double jersey knitted fabric (100):
in which the fabric has a front side (600) and a rear side (500);
in which the fabric comprises a base yarn (308) which is knitted on the rear side (500) of the fabric (100), except for connecting points (240) where the base yarn (308) is knitted on the front side (600) of the fabric (100);
characterized in that
the fabric comprises a first pattern yarn (302), a second pattern yarn (304), and a binding yarn (312); in which the binding yarn (312) is inserted at a position of 1 to 50, preferably 1 to 20, more preferably 1 to 10 and most preferably 1, 2 or 3 stitches before the start of a pattern unit (400);

the binding yarn (312) is knitted on the front side of the fabric before the start of the pattern unit (400) for the abovementioned number of stitches, together with the first pattern yarn (302) which is knitted before on the front side (600) of the fabric (100) the start of the pattern unit (400);

the second pattern yarn (304) is inserted at the start of pattern unit (400) and the first pattern yarn (302) is cut off;

the binding yarn (312) is knitted on the front side (600) of the fabric (100) after the start of the pattern unit (400), together with the second pattern yarn (304) which is knitted on the front side of the fabric in said pattern unit;

the binding yarn (312) is knitted on the front side of the fabric after the end of the pattern unit (400) for the abovementioned number of stitches, together with the second pattern yarn (304) which is knitted on the front side (600) of the fabric (100) after the end of said pattern unit (400);

the binding yarn (312) and the first pattern yarn (302) are subsequently cut off so that the loose ends of the binding yarn (312) and the first pattern yarn (302) are 0.1 to 5 cm long, are preferably 0.5 cm to 2.5 cm long, and are most preferably approximately 1 cm long.

Item 30: A double jersey knitted fabric (100):

which has a front side (600) and a rear side (500);

which comprises a base yarn (308) which is knitted on the rear side (500) of the fabric (100), except for connecting points (240) where the base yarn (308) is knitted on the front side (600) of the fabric (100);

which comprises a first pattern yarn (302), and optionally a second pattern yarn (304) and a third pattern yarn (306);

characterized in that:

the first pattern yarn (302) is inserted at a position of 1 to 50, preferably 1 to 20, more preferably 1 to 10 and most preferably 1, 2 or 3 stitches before the start of a pattern unit (400) which is produced using the respective pattern yarn (302), and is knitted on the rear side of the fabric (100) before the start of the pattern unit (400) for the abovementioned number of stitches;

the first pattern yarn (302) is subsequently knitted on the front side (600) of the fabric in the pattern unit (400);

the first pattern yarn (302) is knitted on the rear side (500) of the fabric (100) after a pattern unit (400) for 1 to 50, preferably 1 to 20, more preferably 1 to 10 and most preferably 1, 2 or 3 stitches after the end of a pattern unit (400); and the first pattern yarn (302) is subsequently cut off;

optionally, the second pattern yarn (304) and the third pattern yarn (306) are knitted in a way similar to that described for the first pattern yarn (302) in and around the pattern units which are produced using said respective yarns.

Item 31: The fabric according to any one of i25 to 30, characterized in that the fabric comprises at least one pattern unit which was made using more than 12 needles, making it possible to knit large patterns.

Item 32: The fabric according to any one of items 25 to 31, characterized in that the fabric is a non-reversible single-sided knitted fabric wherein the desired design is knitted on the front side of the fabric. Double jersey knitted fabrics according to the present invention have a front side and a rear side. By using the rear side as the technical side and the front side as the aesthetic side with a desired design, it is possible to produce a plurality of effects. Thus, it is possible, for example, to create an area of relief fabric by knitting an elastic yarn at relatively high tension on the rear side and a non-elastic yarn at relatively low tension on the front side.

Item 33: The fabric according to any one of items 25 to 32, in which the design of the front side (F) of the fabric which is knitted comprises at least one area of relief fabric. In mattress ticks, relief fabric is currently used to produce a decorative pattern. In addition, the relatively voluminous enclosed space in an area of relief fabric makes it soft to the touch and ensures improved ventilation.

Item 34: The fabric according to any one of items 25 to 33, characterized in that the loose ends (830, 832) of yarns are 0.1 to 5 cm long, are preferably 0.5 cm to 2.5 cm long and are most preferably approximately 1 cm long. The loose ends of the pattern yarns have to have a minimum length, approximately 0.1 cm, to ensure that the yarns are sufficiently anchored in the fabric. On the other hand, the loose ends of the yarns are most preferably not too long, i.e. less than approximately 5 cm, in order to prevent wasting yarn and to prevent anything from showing through. Loose ends of approximately 1 cm are a good compromise between anchoring and preventing anything from showing through or wasting yarn.

Item 35: The fabric according to any one of items 25 to 34, characterized in that the fabric comprises one or more filler threads which are inserted between the front side and the rear side of the double jersey knitted fabric. These filler threads give volume to the space between the front and rear side of the double jersey knitted fabric, rendering the fabric more luxurious to the touch and making it slightly softer. In addition, it benefits the ventilating properties of the fabric and gives the fabric a relief effect.

Item 36: The fabric according to any one of items 25 to 35, characterized in that the loose ends (830, 832) of yarns are inserted between the rear side (500) and the front side (600) of the fabric. Positioning the loose ends (820, 822) in this way may be advantageous when it is undesirable for the loose ends (820, 822) to protrude from the rear side (500) of the fabric (100). This may be the case, for example, when the rear side (500) is subjected to a considerable shear load. If such a shear load acts on the loose ends (820, 822), the fabric (100) might become damaged.

In addition, the loose ends are generally not visible, or hardly at all, on the front side or rear side of the finished fabric in this way.

Item 37: A mattress tick comprising the fabric according to any one of items 25 to 36.

Item 38: A method for producing a fabric according to any one of items 25 to 37.

Item 39: A fabric knitted on a double jersey, double jacquard circular knitting machine:

which has a front side (600) and a near side (500);

which comprises a base yarn (308), a mechanical yarn (310), a pattern yarn (302);

characterized in that:

the pattern yarn (302) is knitted on the front side (600) of the fabric;

the mechanical yarn (312) is inserted at a position of 1 to 50, preferably 1 to 20, more preferably 1 to 10 and most preferably 1, 2 or 3 stitches before the start of a mechanical unit (900) which is produced using the respective mechanical yarn;

the mechanical yarn (362) is knitted on the rear side of the fabric before the start of the mechanical unit (900) for the abovementioned number of stitches, together with the base yarn (308);

the mechanical yarn (312) is knitted on the rear side of the fabric in the mechanical unit (900), except for connecting points where it is knitted on the front side of the fabric;

the mechanical yarn (312) is knitted on the rear side of the fabric after the mechanical unit (900) which is produced using the respective mechanical yarn, for 1 to 50, preferably 1 to 20, more preferably 1 to 10 and most preferably 1, 2 or 3 stitches, together with the base yarn (308); and the mechanical yarn (312) is subsequently cut off.

By using mechanical yarns on the rear side of the fabric, it is for example possible to introduce variations in elasticity. Knitting mechanical yarns only locally can result in a significant cost saving, since such yarns are, for example, only required in well-defined locations in the mattress tick. Thus, the mechanical yarns may be provided in a well-defined zone in order to support, for example, the shoulder or hip. With such a system, a base yarn is alternated with a mechanical yarn on the dial, with both yarns together completing one line and overlapping in, for example, 1 to 50, preferably 1 to 20, more preferably 1 to 10 and most preferably 1, 2 or 3 stitches.

Item 40: The fabric according to item 39 which comprises a second pattern yarn (304), in which:

the second pattern yarn (304) is inserted at a position of 1 to 50, preferably 1 to 20, more preferably 1 to 10 and most preferably 1, 2 or 3 stitches before the start of a pattern unit (400) which is produced using the respective second pattern yarn (304) and is knitted on the rear side of the fabric before the start of the pattern unit (400) for the abovementioned number of stitches;

the second pattern yarn (304) is subsequently knitted on the front side of the fabric in the pattern unit (400);

the second pattern yarn (304) is knitted on the rear side of the fabric after the pattern unit (400) for 1 to 50, preferably 1 to 20, more preferably 1 to 10 and most preferably 1, 2 or 3 stitches after the end of the pattern unit;

the second pattern yarn (304) is subsequently cut off.

Item 41: The fabric according to any one of items 39 to 40, characterized in that the fabric comprises a pattern unit and/or a mechanical unit which consists of more than 12 needles, making it possible to knit large designs.

Item 42: The fabric according to any one of items 39 to 41, characterized in that the fabric is a non-reversible single-sided knitted fabric wherein the desired design is knitted on the front side of the fabric. Double jersey knitted fabrics according to the present invention have a front side and a rear side. By using the rear side as the technical side and the front side as the aesthetic side with a desired design, it is possible to produce a plurality of effects. Thus, it is possible, for example, to create an area of relief fabric by knitting an elastic yarn at relatively high tension on the rear side and a non-elastic yarn at relatively low tension on the front side.

Item 43: The fabric according to any one of items 39 to 42, in which the design of the front side (F) of the fabric comprises at least one area of relief fabric. In mattress ticks, relief fabric is currently used to produce a decorative pattern. In addition, the relatively voluminous enclosed space in an area of relief fabric makes it soft to the touch and ensures improved ventilation.

Item 44: The fabric according to any one of items 39 to 43, characterized in that the loose ends are 0.1 to 5 cm long, are preferably 0.5 cm to 2.5 cm long and are most preferably approximately 1 cm long. The loose ends of the mechanical yarns have to have a minimum length, approximately 0.1 cm, to ensure that the yarns are sufficiently anchored in the fabric. On the other hand, the loose ends of the yarns are most preferably not too long, i.e. less than approximately 5 cm, in order to prevent wasting yarn and to prevent anything from showing through. Loose ends of approximately 1 cm are a good compromise between anchoring and preventing anything from showing through or wasting yarn.

The loose ends of the pattern yarns also have to have a minimum length, approximately 0.1 cm, to ensure that the yarns are sufficiently anchored in the fabric. On the other hand, the loose ends of the yarns are most preferably not too long, i.e. less than approximately 5 cm, in order to prevent wasting yarn and to prevent anything from showing through. Loose ends of approximately 1 cm are a good compromise between anchoring and preventing anything from showing through or wasting yarn.

Item 45: The fabric according to any one of items 39 to 44, characterized in that the fabric is provided with one or more filler threads which are inserted between the front side and the rear side of the fabric. These filler threads give volume to the space between the front and rear side of the double jersey knitted fabric which renders the fabric more luxurious to the touch and makes it slightly softer. In addition, it benefits the ventilating properties of the fabric and gives the fabric a relief effect.

Item 46: The fabric according to any one of items 39 to 45, characterized in that the loose ends are inserted between the rear side and the front side of the knitted fabric. Positioning the loose ends (820, 822) in this way may be advantageous when it is undesirable for the loose ends (820, 822) to protrude from the rear side (500) of the fabric (100). This may be the case, for example, when the rear side (500) is subjected to a considerable shear load. If such a shear load acts on the loose ends (820, 822), the fabric (100) might become damaged.

In addition, the loose ends are generally not visible, or hardly at all, on the front side or rear side of the finished fabric in this way.

Item 47: A mattress tick comprising the fabric according to any one of items 39 to 46.

Item 48: A method for producing a fabric according to any one of items 39 to 47.

Item 49: In a further aspect, the present invention encompasses a double jersey, double jacquard circular knitting machine which comprises a cylinder (C) and a dial (D)

which is provided with one or more yarn selection mechanisms in which the double jersey, double jacquard circular knitting machine is suitable for knitting a double jersey knitted fabric according to any one of items 24 or 30 to 37, or a double jersey knitted fabric produced according to the method according to any one of items 15 to 23;

and in which:

each yarn selection mechanism is provided with a yarn-cutting device;

each yarn selection mechanism is configured to be able to perform a yarn change at any position in the double jersey knitted fabric.

On a circular knitting machine according to this aspect of the present invention, it is possible to knit double jersey knitted fabrics according to other aspects of the present invention in an efficient manner.

Item 50: In yet a further aspect, the present invention encompasses a double jersey, single jacquard circular knitting machine
- which comprises a cylinder (C) and a dial (D)
- which is provided with one or more yarn selection mechanisms
  - which is suitable for knitting a double jersey knitted fabric according to any one of items 14, 25 to 29 or 31 to 37, or a double jersey knitted fabric made according to the method according to any one of items 1 to 13;
  - and in which:
- each yarn selection mechanism is provided with a yarn-cutting device;
- each yarn selection mechanism is configured to be able to perform a yarn change at any position in the double jersey knitted fabric.

In a particular embodiment of item 49 or 50, said yarn selector is capable of introducing, feeding and cutting one or more yarns at any random position of the dial. This implies that at any random position of the dial, the dial needles would either be able to be temporarily retracted in said random position to allow the yarn selector to feed the yarn, or that the yarn selector would be able to temporarily move in the proximity of the dial needles to feed the yarn to said random position.

On a circular knitting machine according to this aspect of the present invention, it is possible to knit double jersey knitted fabrics according to other aspects of the present invention in an efficient manner.

In accordance with items 49 and 50, the yarn selectors can comprise a yarn feeding, clamping and cutting unit.

This makes it possible to feed the pattern or mechanical yarn to the needles by the respective yarn selector at a position of 1 to 50, preferably 1 to 20, more preferably 1 to 10 and most preferably 1, 2 or 3 stitches before the start of the pattern unit,
- following which the yarn is first knitted in on the rear side of the fabric by the needles of the dial for the number of stitches mentioned,
- following which the yarn is knitted in by the needles of the cylinder on the front side of the fabric to form the pattern unit, and finally,
- following which the yarn is again knitted in by the needles of the dial on the rear side of the fabric for the number of stitches mentioned. Providing or feeding the yarns by the yarn selector may also be assisted by the clamping unit which may clamp the yarn before it is inserted and subsequently immediately release it, as soon as the yarn has been caught by the needles of the dial;
- the yarn is subsequently taken to the cutting unit by the yarn selector and the yarn can e.g. be clamped by the clamping unit and cut off by the cutting unit. Typically, this produces a loose end having a length of approximately 0.1 to 5 cm, preferably 0.5 cm to 2.5 cm, and most preferably approximately 1 cm, which is inserted between the knitted fabrics of the front and rear side.

Although it is unusual, it is possible in any of the method aspects 14 to 22 in which a double jersey double jacquard circular knitting machine is used, the fabrics which are produced thereby or the fabrics described in any of the aspects 23, 28, 37-45, for the front side of the fabric to be knitted alternatively on the dial and the rear side to be knitted on the dial. The respective aspects can be modified by someone skilled in the art in a manner completely analogously to the above-described aspects, in which the respective pattern yarns (302, 304, 306) are inserted, knitted and/or cut off on the dial and in which the base yarn (308) and/or mechanical yarn (310) is substantially inserted, knitted and/or cut off on the cylinder analogously to the above-described aspects. The direction of rotation of the circular knitting machine is not limited either, but is shown in all examples and embodiments described herein as being counterclockwise for the sake of simplicity (the knitting pattern runs from left to right). Analogously, the person skilled in the art may modify the operation and the knitting patterns in such a way that the circular knitting machine is able to rotate clockwise, if required.

BRIEF DESCRIPTION OF THE DRAWING FIGURES

DETAILED DESCRIPTION OF THE INVENTION

Figure 1:
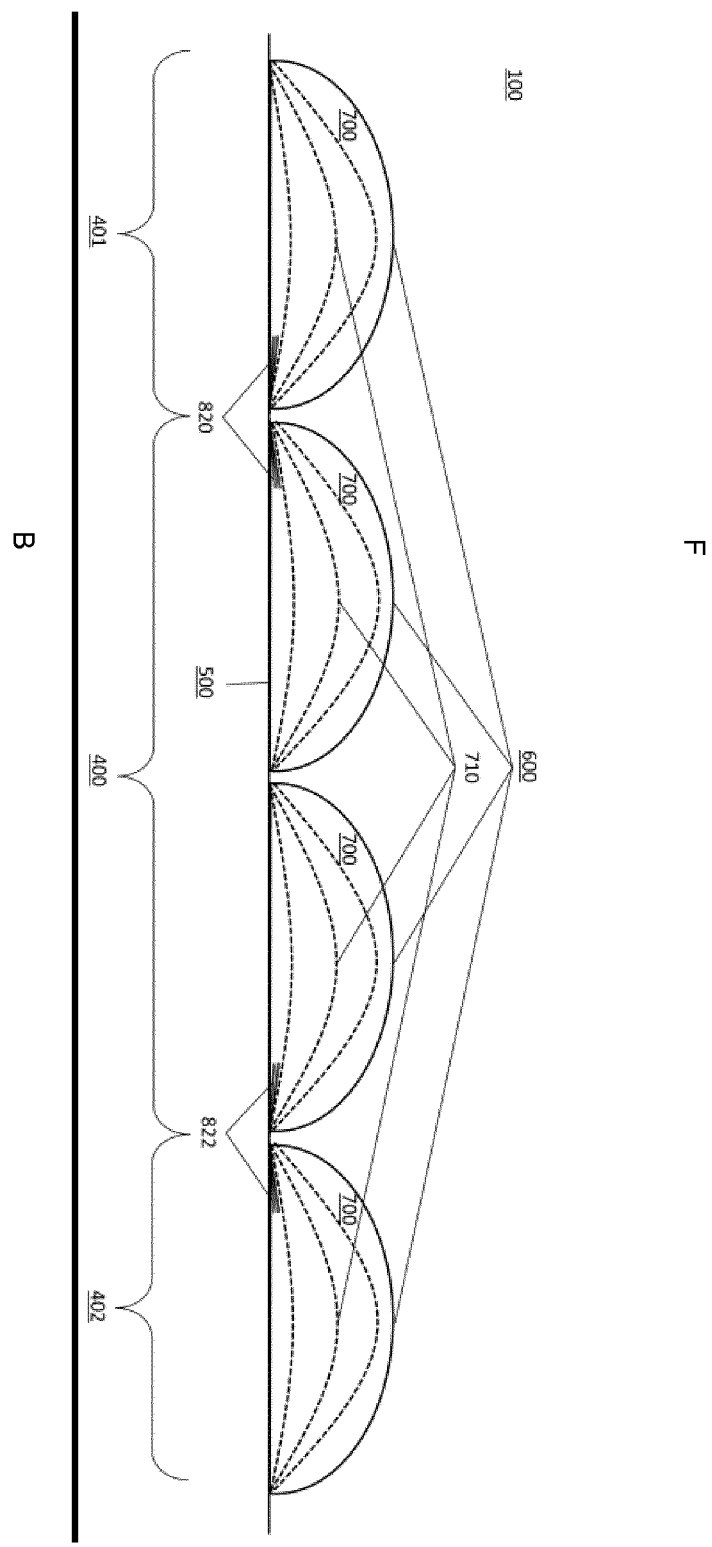
FIG. 1 shows a specific embodiment of a fabric (100) according to the present invention.

As used below in this text, the singular forms, "the" include both the singular and the plural, unless the context clearly indicates otherwise.

The terms "comprise", "comprises" as used below are synonymous with "including", "include" or "contain", "contains" and are inclusive or open and do not exclude additional unmentioned parts, elements or method steps. The terms "comprise", "comprises" include the term "contain".

The enumeration of numeric values by means of ranges of figures comprises all values and fractions in these ranges, as well as the cited end points.

The term "approximately" as used when referring to a measurable value, such as a parameter, an amount, a time period, and the like, is intended to include variations of +/−10% or less, preferably +/−5% or less, more preferably +/−1% or less, and still more preferably +/−0.1% or less, of and from the specified value, in so far as the variations apply to the invention disclosed herein. It should be understood that the value to which the term "approximately" refers per se has also been disclosed.

All references cited in this description are hereby deemed to be incorporated in their entirety by way of reference.

Unless defined otherwise, all terms disclosed in the invention, including technical and scientific terms, have the meaning which a person skilled in the art usually gives them. For further guidance, definitions are included to further explain terms which are used in the description of the invention.

The present invention provides a method to achieve cost savings without loss of quality in the field of double jersey knitted fabrics, in particular double jersey knitted mattress ticks. The invention furthermore provides a fabric produced by this method and the use of a double jersey, preferably double jacquard, circular knitting machine in such a method.

Thus, the present invention for example provides a method for knitting a double jersey fabric in which expensive, aesthetic pattern yarns are inserted into a knitted fabric a few stitches before a pattern unit. These pattern yarns are, for example, anchored on the rear side of the fabric before the start of the pattern unit using a few stitches. In a pattern unit, the expensive pattern yarns are subsequently knitted on the front side of the fabric and after the pattern unit, the expensive pattern yarns are knitted for anchoring on the rear side of the fabric for a few stitches before being cut off. The loose ends of the pattern yarns are preferably only approximately one centimetre long, as a result of which the risk of anything showing through is eliminated. In addition, a significant amount of expensive pattern yarn is saved compared to the method as described, for example, in EP1975294 because expensive pattern yarns are only knitted in a pattern unit and in the immediate vicinity of a pattern unit.

An analoguous method makes a saving on mechanical yarn possible by inserting mechanical yarn only a few stitches before a mechanical unit (or pattern) and cutting off the mechanical yarn a few stitches after the mechanical unit.

Generally, any lay-in threads or filler threads (lay-in yarn or filler yarn) cover the loose ends of the cut-off pattern yarn, because these are anchored on the rear side of the fabric. As a result thereof, any risk of anything showing through in the region of the fabric where the loose ends have been inserted between the front and the rear side of the fabric is eliminated.

For the sake of completeness, it should be noted that, in the prior art, with double jersey knitted fabrics, the intarsia technique is being used to knit yarns only in a specific location of a fabric. In that sense, this technique is a technology which has the same objective as the present invention. However, the intarsia technique requires a much more expensive machine as the machine has to rotate both clockwise and anticlockwise during the knitting process (return-knitting). Because this involves constant changes in direction, the knitting process proceeds at a much slower speed, resulting in lower productivity compared to the present invention. Finally, with the intarsia technique the freedom of design is also much more limited than with a knitting technique according to the present invention. In particular, it is not easy to produce asymmetrical designs by means of the intarsia technique.

In the subsequent paragraphs, the operation of the cutting device and the yarn selector is illustrated for pattern yarns and mechanical yarns. The operation applies analogously to binding yarns, mutatis mutandis. In order to describe the operation of the cutting device and yarn selector, the selection of pattern and/or mechanical yarns on a double jacquard circular knitting machine is described below by way of non-limiting example. The person skilled in the art will understand that such systems can also be installed on e single jacquard circular knitting machine, in which case the operation is modified in accordance with the methods for such equipment as described herein.

1) The pattern or mechanical yarn to be selected is fed to the needles by the respective yarn selector at a position of 1 to 50, preferably 1 to 20, more preferably 1 to 10 and most preferably 1, 2 or 3 stitches before the start of the respective pattern unit, following which the yarn is first knitted in by the needles of the dial for the mentioned number of stitches on the rear side of the fabric, the yarn is subsequently knitted in by the needles of the cylinder on the front side of the fabric in order to produce the pattern unit and, finally, the yarn is again knitted in by the needles of the dial for the mentioned number of stitches on the rear side of the fabric. Providing or feeding the yarns by the yarn selector may also be aided by the clamping unit of the cutting device which can clamp the yarn for insertion and then immediately release the yarn once it has been carried along by the needles of the dial;

2) When it has past the respective pattern unit, the yarn to be cut off is subsequently taken to the cutting device by the yarn selector and the yarn is clamped by the clamping unit and cut off by the cutting unit. Typically, a loose end having a length of approximately 0.1 to 5 cm, preferably 0.5 cm to 2.5 cm, and most preferably approximately 1 cm, is formed in this case, which is tucked away between the knitted fabrics of the front and rear side.

In a specific embodiment, the present invention comprises a double jersey knitted fabric (100), as illustrated in FIG. 1. The double jersey knitted fabric (100) has a rear side (500) and a front side (600), knitted by one or more pattern yarns (302, 304, 306). The front side (600) of the fabric (100) is knitted on the cylinder (C) and the rear side (500) of the fabric (100) is knitted on the dial (D) by a base yarn (308). Between the front side (600) of the fabric (100) and the rear side (500) of the fabric (100), there is an enclosed space, the inner side (700) of the fabric (100). The inner side (700) of the fabric (100) optionally contains filler threads (710) which are intended to give volume to the fabric (100). This improves the ventilation of the fabric (100) and renders the fabric (100) softer to the touch. The yarns (302, 304, 306) used to knit a pattern unit (400) on the front side (600) of the fabric (100) are inserted a few stitches before the pattern unit (220) on the rear side of the fabric. The pattern yarns (302, 304, 306) used to knit a pattern unit (400) on the front side (600) of the fabric (100) are cut off after a few stitches which are knitted behind the pattern unit (400) on the rear side of the fabric. These yarns (302, 304, 306) are inserted and cut off in such a way that loose ends (820, 822) are created. These loose ends (820, 822) are positioned and/or fixed on the inner side (700) of the fabric (100) so that they are situated between the filler threads (710) and the rear side (500) of the fabric (100).

Positioning the loose ends (820, 822) in this way may be advantageous when it is undesirable for the loose ends (820, 822) to protrude from the rear side (500) of the fabric (100). This may be the case, for example, when the rear side (500) is subjected to a considerable shear load. If such a shear load acts on the loose ends (820, 822), the fabric (100) might become damaged.

Figure 2:
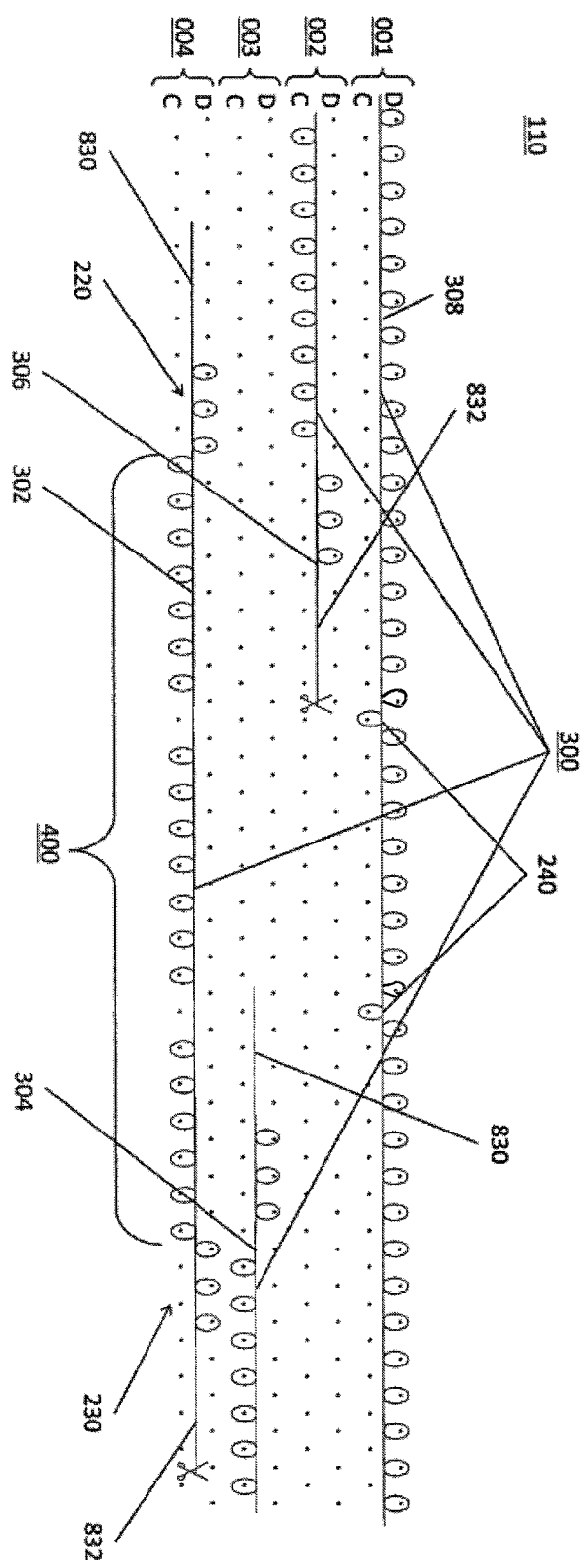
FIG. 2 shows a specific embodiment of a knitting pattern (110) for a fabric (100) according to the present invention which comprises four different yarns (300), knitted on a double jersey, double jacquard circular knitting machine with 4 knitting systems (001-004).

In a further specific embodiment, the present invention comprises a method for knitting a double jersey fabric according to the present invention as well as the knitted fabric itself, as represented in the form of knitting pattern (110) in FIG. 2. The knitting pattern (110) comprises instructions for knitting four yarns (300) on the dial (D) and the cylinder (C) of a double jacquard, double jersey circular knitting machine. The rear side of the fabric is knitted on the dial (D) and the front side of the fabric is knitted on the cylinder (C). The yarns (300) are subdivided into two types of yarn. Base yarns (308) are only knitted on the rear side of the fabric (100), except for connecting points (240) between the rear side (500) and the front side (600) of the fabric (100) in a pattern unit (400). In this example, the pattern unit (400) is designed as a relief fabric. Pattern yarns (302, 304, 306) are only knitted on the front side of the fabric, except for a number of, for example three, stitches (220, 230) adjacent to a pattern unit (400) which are knitted on the rear side of the fabric. These few stitches (220, 230) serve as anchoring points between the front and rear side of the fabric (100). The pattern yarns (302, 304, 306) are inserted by a yarn selection mechanism shortly before their respective pattern unit (400) which is being knitted using the respective yarn(s) and they are cut off by a cutting device shortly after the respective pattern unit (400). This results in loose ends (830, 832). Inserting and cutting off the pattern yarns (302, 304, 306) just before and after the pattern unit (400) has various positive effects. Firstly, less pattern yarn is used, resulting in a significant saving in material and costs. Secondly, a showing-through effect is prevented which could occur if the pattern yarns (302, 304, 306) floated over long distances between the pattern units (400). Thirdly, it is possible to produce knitted fabrics which are more lightweight while retaining the same quality.

Figure 3:
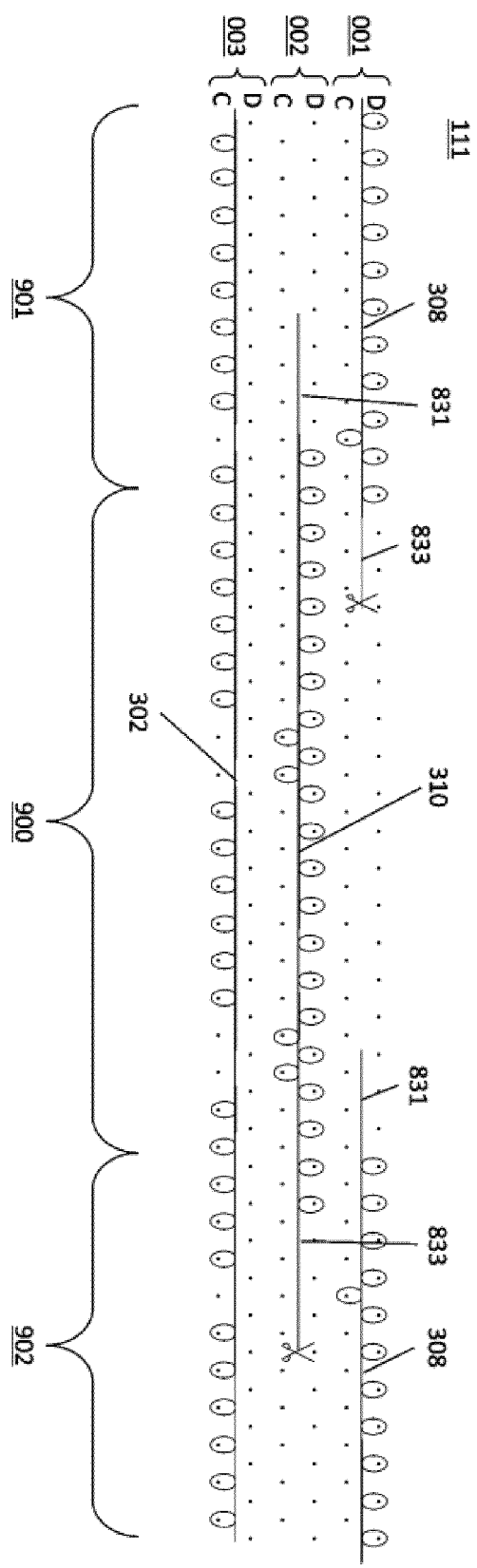
FIG. 3 shows a specific embodiment of a knitting pattern (111) for a fabric (100) according to the present invention which comprises three different yarns (308, 310, 302), in which the knitting pattern (111) comprises instructions for producing a mechanical unit (900).

In a further specific embodiment, the present invention comprises a knitting pattern (111) as illustrated in FIG. 3. The knitting pattern (111) comprises instructions for knitting three yarns (308, 310, 302). Two yarns, one base yarn (308) and a mechanical yarn (310) are alternately knitted on the rear side, except in connecting points, and have a different elasticity. Thus, a fabric is produced which is elastic in a certain area (the mechanical unit) and is not elastic in another area, or to a lesser degree. Knitting of the base yarn (308) on the dial (D) starts according to the known double jersey technique. The mechanical yarn (310) is inserted a few stitches before the mechanical unit (900) and knitted on the dial for a few stitches together with the base yarn (308), after which the base yarn is cut off. A few stitches before the end of the mechanical unit (900), the base yarn is inserted again and knitted on the dial together with the mechanical yarn (310), after which the mechanical yarn is cut off. Thereafter, knitting is continued with the base yarn on the dial. In this way, a continuous line is formed in the knitted fabric on the dial which alternately contains a base yarn or a mechanical yarn, and only overlaps for a few stitches. The two yarns (308, 310) also comprise loose ends (831, 833) which are tucked away between the front side and rear side. The front side of the knitted fabric is knitted simultaneously with, for example, pattern yarns (302, 304, 306) on the cylinder (C). This process may be combined with a technique in which pattern yarns are inserted and cut off to form the pattern as described above.

Figure 4:
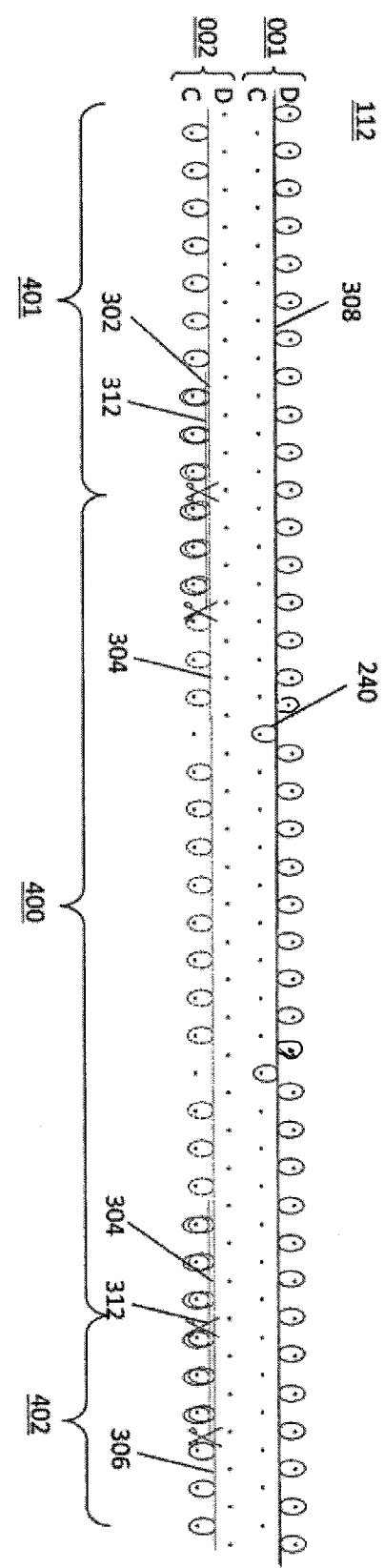
FIG. 4 shows a specific embodiment of a knitting pattern (112) for a fabric (100) according to the present invention which comprises four different yarns (308, 302, 304, 306), knitted on two systems (001, 002).

In a specific embodiment, the present fabric comprises a knitting pattern (112), knitted on two systems (001, 002), for knitting three or more yarns (308, 302, 304, 306). A base yarn (308) is knitted in a first system on the dial (D) of a double jersey, single jacquard circular knitting machine, except for connecting points (240) where the front side and the rear side of the fabric are connected to each other by means of base yarn (308). A first and a second pattern yarn (302, 304) are knitted on the cylinder (C) of the circular knitting machine (FIG. 4). Pattern yarn (302) is knitted in pattern unit (401) and yarn (304) is knitted in the subsequent pattern unit (400). Pattern yarn (304) is inserted at the start of pattern unit (400) in which the respective yarn is knitted. Pattern yarn (302) is cut off at the end of the preceding pattern unit (401). In the transition regions between the successive pattern units (400 and 401), a binding yarn (312) is knitted together by means of yarns (302 and 304) to form double stitches by means of a plating technique (French: vanisage). The binding yarn may optionally be a thinner yarn than the pattern yarn. The term "thinner" as used herein means that the binding thread (312) has a diameter which is preferably smaller than that of the pattern yarns (302, 304) with which the binding thread is knitted together. A binding thread (312) which has approximately the same diameter as pattern yarns (302, 304) may also be used. In this way, pattern yarns (302, 304) are mechanically anchored at the transition between two pattern units (401 and 400). A similar system can be used for a further pattern yarn (306) with which a subsequent pattern unit (402) is knitted.

Figure 5:
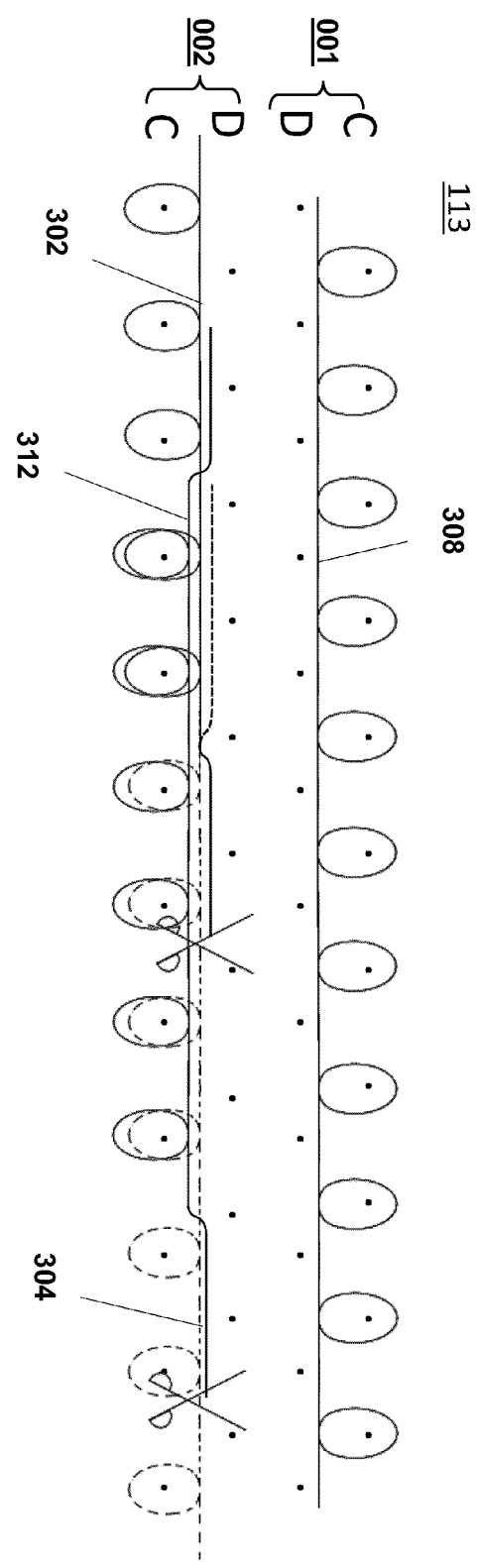
FIG. 5 shows a specific embodiment of the start of a pattern unit in a knitting pattern (113) for a fabric (100) according to the present invention which comprises four different yarns (308, 302, 312, 304), knitted on two systems.

In a further specific embodiment, the present invention comprises the start of a pattern unit, represented as knitting pattern (113) in FIG. 5, for a fabric (100) according to the present invention. The knitting pattern comprises four different yarns (308, 302, 304, 306), knitted on two systems. Base yarn (308) is knitted on the rear side of the fabric. Pattern yarn (302) is knitted on the front side, just before a pattern unit which is knitted by means of a second pattern yarn (304). Pattern yarns (302) and (304) are anchored to each other by means of a binding yarn (312) which is knitted together with first pattern yarn (302) for a number of stitches, for example three stitches, before the start of the pattern unit which is produced using the second pattern yarn (304). The binding yarn (312) is also knitted together with the second pattern yarn (304) during the first stitches of the pattern unit which is produced using pattern yarn (304). The number of stitches is obviously not limited to the number of stitches mentioned here, but may also be, for example 1, 2, 3, 4, 5 or more stitches, such as for example 1 to 10, 1 to 20 or 1 to 50 stitches.

Figure 6:
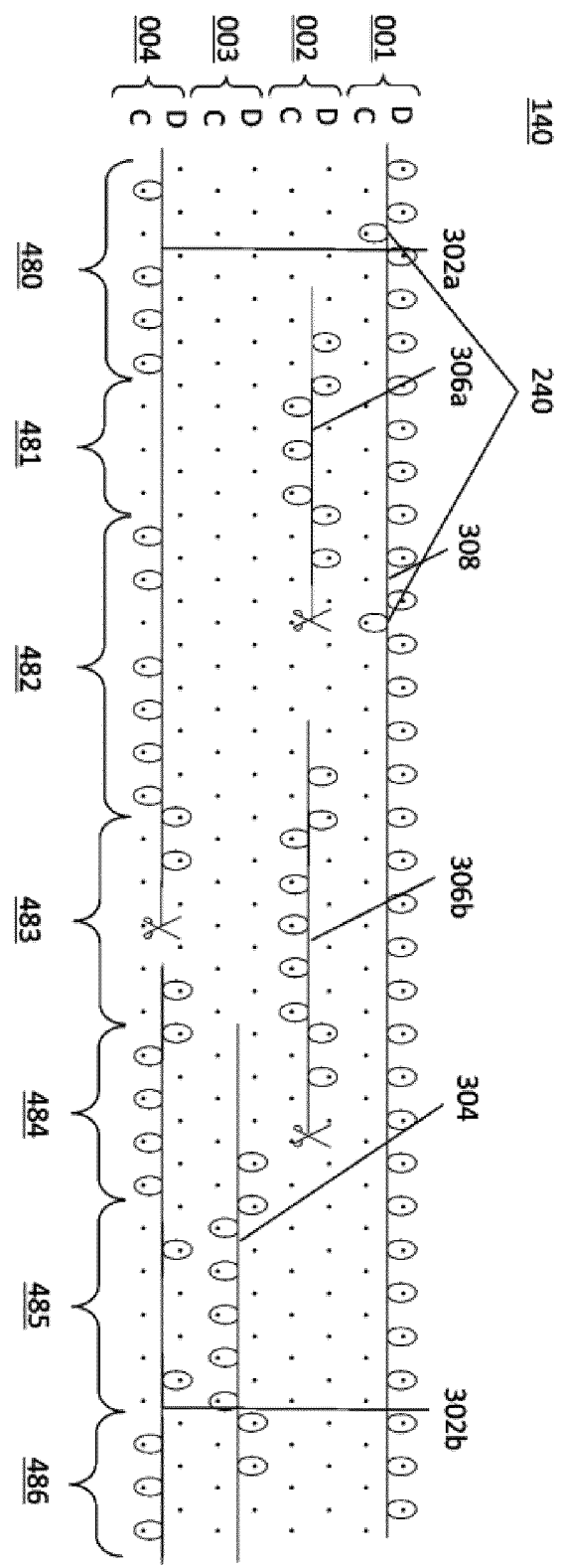
FIG. 6 shows a combination of a number of different specific embodiments according to the present invention.

In a further specific embodiment, a combination of different abovementioned aspects and embodiments is illustrated. In this specific embodiment, the present invention comprises a knitting pattern (140) for a fabric (100), as illustrated in FIG. 6. The fabric is knitted by means of four systems (001, 002, 003, 004). On system (001), a base yarn (308) is knitted on the dial, except for connecting points which are knitted on the cylinder. In systems (002, 003, 004), aesthetic pattern yarns (302a, 302b, 304, 306a, 306b) are knitted which are mainly knitted on the front side, except for anchoring points which are knitted on the dial. The knitting pattern (140) comprises instructions for knitting different pattern units (480, 481, 482, 483, 484, 485, 486) by means of different yarns (302a, 302b, 304, 306a, 306b). Pattern unit (480) is produced using pattern yarn (302a) and comprises an anchoring point (240) produced using base yarn (308). Pattern yarn (302a) is not cut off after pattern unit (480), but remains floating between the cylinder and the dial to be picked up again by the needles of the cylinder in pattern unit (482). Pattern unit (481) is produced using yarn (306a). Pattern yarn (306a) is only fixed on the dial by means of a few, for example two, stitches after inserting the yarn and a few, for example two, stitches before cutting the pattern yarn (306a). Pattern unit (482) is produced using pattern yarn (302a) and comprises one connecting point which is produced using base yarn (308). Pattern yarn (302a) is knitted on the dial after pattern unit (482) for a few, for example two, stitches and is subsequently cut off. Pattern unit (483) is produced using pattern yarn (306b). Pattern yarn (306b) is inserted before pattern unit (483), is knitted on the dial for a few, for example two, stitches before and after pattern unit (483) and is subsequently cut off. Pattern unit (484) is produced using pattern yarn (302b). Pattern yarn (302b) is inserted before pattern unit (484) and knitted on the dial for a few, for example two, stitches before pattern unit (484). After pattern unit (484), pattern yarn (302b) floats between the cylinder and the dial, except for connecting points on the dial. Pattern unit (485) is produced using a third pattern yarn (304). Third pattern yarn (304) is inserted before pattern unit (485), is knitted on the dial for a few, for example two, stitches before and after pattern unit (485) and floats after pattern unit (485) between the cylinder and the dial or can be cut off. Pattern unit (486) is produced using pattern yarn (302b). In this example, pattern yarns 302a and 302b are different parts of the same yarn. The second pattern yarns 306a and 306b are also different parts of the same yarn. Alternatively, the first, second and third pattern yarns may also in each case be composed of a different type (colour, form, thickness, finish, . . . ) of pattern yarn. The number of stitches is obviously not limited to the number of stitches mentioned herein, but may be, for example 1, 2, 3, 4, 5 or more stitches, such as for example 1 to 10, 1 to 20 or 1 to 50 stitches.

Figure 7:
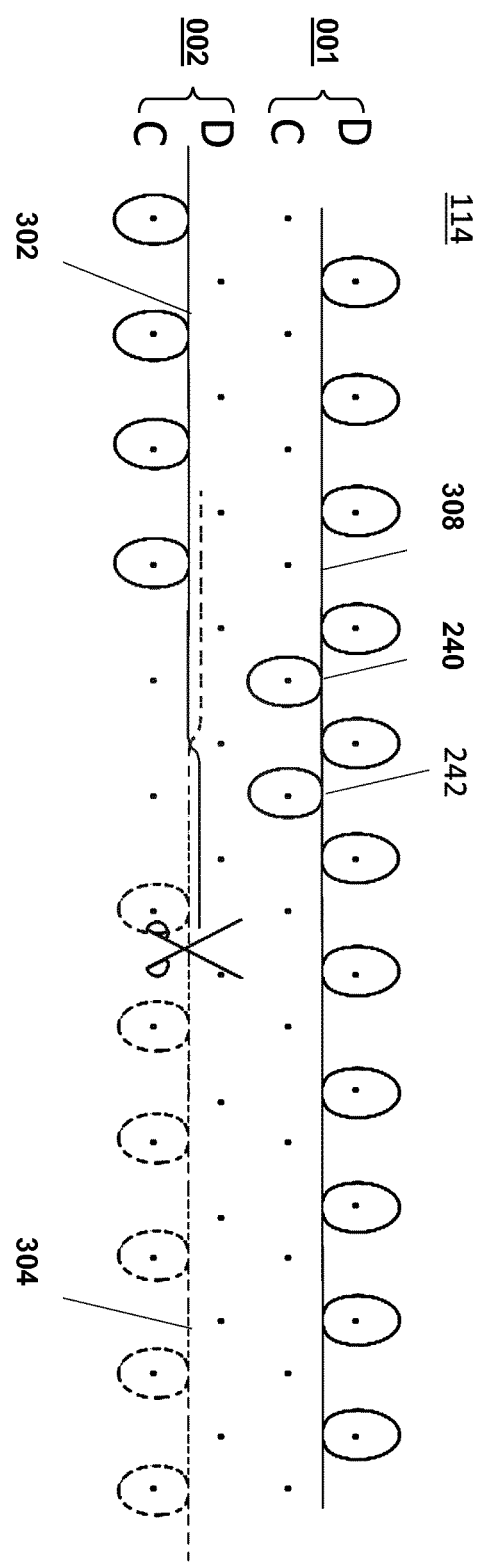
FIG. 7 shows a specific embodiment of the start of a pattern unit in a knitting pattern for a fabric (100) according to the present invention which comprises three different yarns (308, 302, 304), knitted on two systems.

In a further specific embodiment, the present invention comprises the start of a pattern unit represented as knitting pattern (114) in FIG. 7 for a fabric (100) according to the present invention. The knitting pattern comprises three different yarns (308, 302, 304), knitted on two systems. Base yarn (308) is knitted on the rear side of the fabric, except for connecting points (240, 242) at the transition between a first area where pattern yarn (302) is knitted on the front side of the fabric, and a second area where yarn (304) is knitted on the front side of the fabric. Connecting points (241, 242) ensure that yarns (302) and yarn (304) are anchored.

Figure 8:
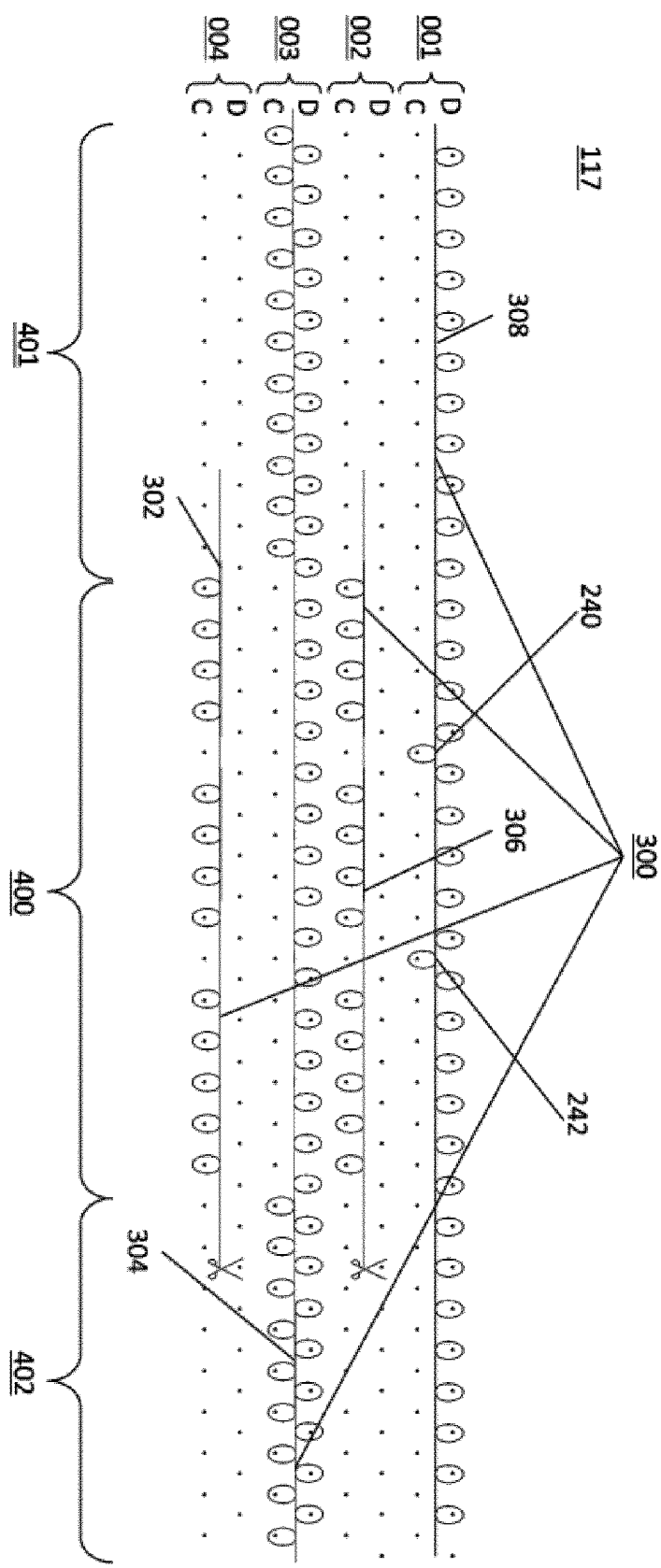
FIG. 8 shows a specific embodiment of a knitting pattern (117) for a fabric (100) according to the present invention which comprises four yarns (300), knitted on four systems.

In a further specific embodiment, the present invention comprises a knitting pattern (117) for knitting a fabric (100) by means of four yarns (300), knitted by means of four systems. First base yarn (308) is only knitted on the dial (D), except for connecting points (240, 242). A second pattern yarn (302) is only knitted on the cylinder (C) in a pattern unit (400) which is produced using said second yarn. Pattern yarn (302) is inserted at the start of pattern unit (400) and is cut off after the end of pattern unit (400). Another, second, pattern yarn (304) is knitted in the preceding and subsequent pattern units (401 and 402, respectively), both on the cylinder (C) and on the dial (D). In pattern unit (400), the second pattern yarn (304) is only knitted on the dial (D). A further pattern yarn (306) may be knitted in the same manner as the third yarn (302), but on another knitting system (cf. FIG. 8).

Figure 9:
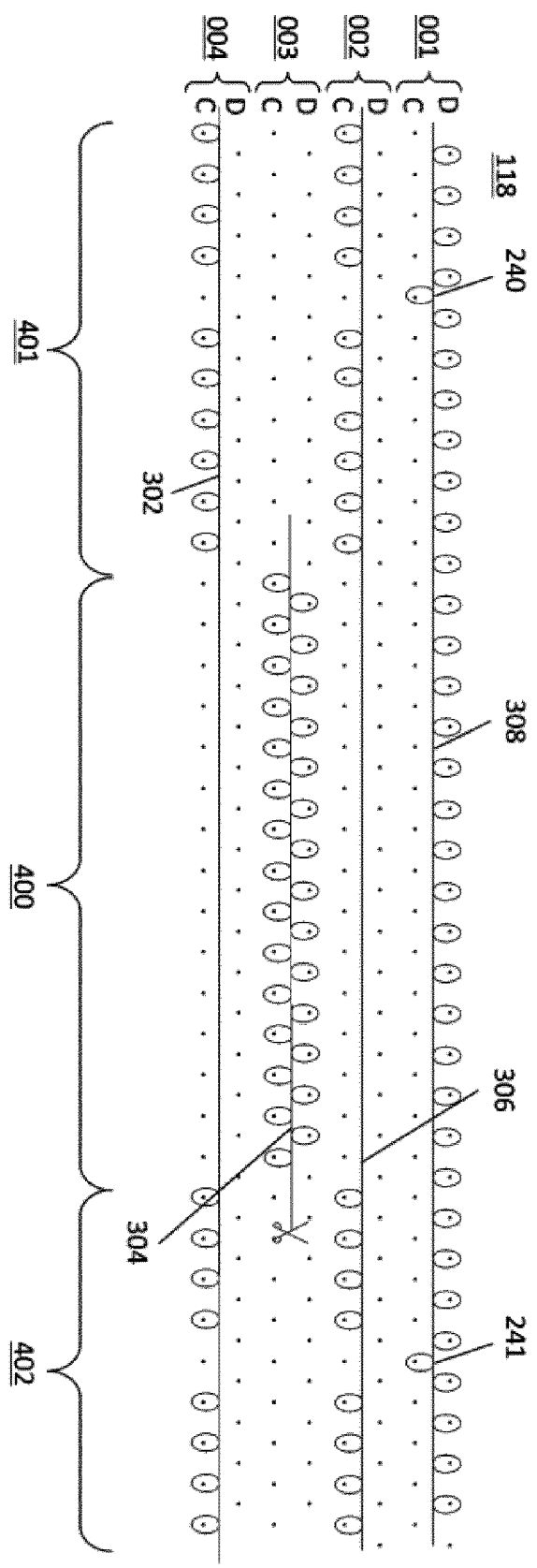
FIG. 9 shows a specific embodiment of a knitting pattern (118) for a fabric (100) according to the present invention which comprises four yarns (302, 304, 306, 308), knitted on four systems.

In a further specific embodiment, the present invention comprises a knitting pattern (118) for knitting a fabric (100) by means of at least 2 yarns (300), knitted by means of at least 2 knitting systems. First base yarn (308) is only knitted on the dial (D), except for connecting points (240, 241). A second pattern yarn (304) is inserted before the start of a pattern yarn (304) which is produced using said respective pattern yarn (304). This pattern yarn (304) is knitted on both the front side (600) and the rear side (500) of the fabric in the respective pattern unit (400) and is cut off after the pattern unit (cf. FIG. 9). Second pattern yarn (302) and optionally third pattern yarn (306) are only knitted on the front side of the fabric if three or four knitting systems are being used.

Figure 10:
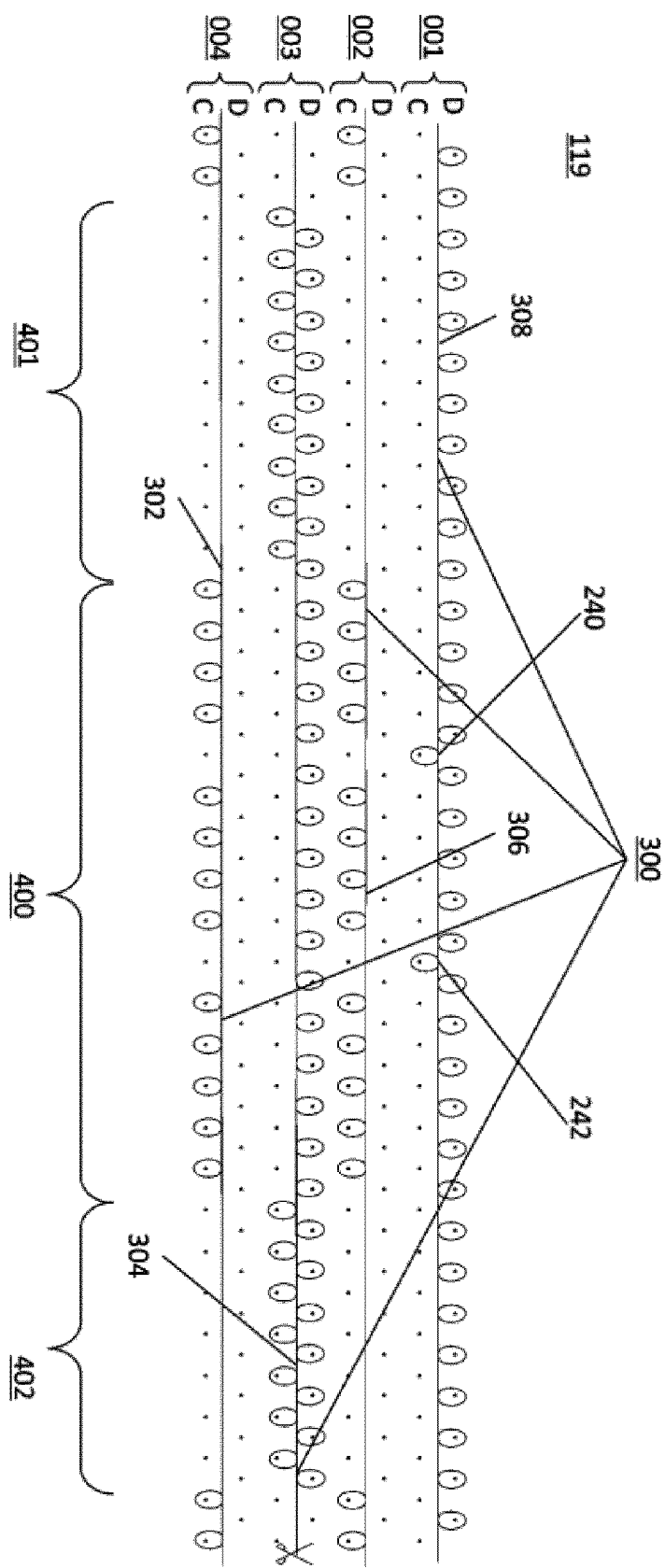
FIG. 10 shows a specific embodiment of a knitting pattern (119) for a fabric (100) according to the present invention which comprises four yarns (300), knitted on four systems.

In a further specific embodiment, the present invention comprises a knitting pattern (119) for knitting a fabric (100) by means of four yarns (300), knitted by means of four knitting systems. Base yarn (308) is only knitted on the dial (D), except for connecting points (240, 242). Pattern yarn (302) is only knitted on the cylinder (C) in a pattern unit (400) which is produced using this second yarn. This pattern unit is preceded by a first pattern unit (401) and followed by a third pattern unit (402). Pattern yarn (302) floats between the front side (600) and the rear side (500) of the fabric in the preceding (first) pattern unit (401) and the subsequent (third) pattern unit (402) which is not produced using the pattern yarn (302). Alternatively, the pattern yarn (302) may be inserted before the pattern unit (400) and may be cut off after the first pattern unit (401), analogous to the embodiment described in FIG. 8. Another pattern yarn (304) is inserted, for example, at the start of first pattern unit (401) and is cut off after the end of the third pattern unit (402) and is knitted on both the cylinder (C) and the dial (D) in the preceding and subsequent pattern units (401 and 402, respectively). In the first pattern unit (400), the third yarn (304) is only knitted on the dial (D). A third pattern yarn (306) may be knitted in the same way as the third yarn (302) on another knitting system (cf. FIG. 10).

What is claimed is:

1. A method for knitting a double jersey knitted fabric on a double jersey, single jacquard circular knitting machine, a cylinder of which rotates in only one direction, wherein the fabric has a front side and a rear side, the method comprising the steps of:

knitting the front side of the fabric on a cylinder (C) of the circular knitting machine;

knitting the rear side of the fabric on a dial (D) of the circular knitting machine;

knitting a base yarn on the rear side of the fabric, except for connecting points, where a base yarn is knitted on the front side of the fabric, the method further comprising the following steps which are carried out several times within a stitch row:

inserting a pattern yarn before a start of a pattern unit, wherein the pattern unit is produced using the pattern yarn;

knitting the pattern yarn on the front side of the fabric in the pattern unit; and cutting off the pattern yarn after the pattern unit.

2. A method for knitting a double jersey knitted fabric on a double jersey, single jacquard circular knitting machine, a cylinder of which rotates in only one direction wherein the fabric has a front side and a rear side, the method comprising the steps of:

knitting the front side of the fabric on a cylinder (C) of the circular knitting machine;

knitting the rear side of the fabric on a dial (D) of the circular knitting machine;

knitting a base yarn on the rear side of the fabric, except for connecting points, where a base yarn is knitted on the front side of the fabric, the method further comprising the following steps which are carried out several times within a stitch row:

inserting a pattern yarn before a start of a pattern unit, wherein the pattern unit is produced using the pattern yarn;

knitting the pattern yarn on both the front side and the rear side of the fabric in the pattern unit; and cutting off the pattern yarn after the pattern unit is produced using the pattern yarn.

3. A method for knitting a double jersey knitted fabric having a front side, a rear side, a base yarn, and at least one of: a first pattern yarn, a second pattern yarn and a third pattern yarn, on a double jersey, double jacquard circular knitting machine configured with a cylinder (C) that rotates in only one direction and a dial (D), wherein needles of the cylinder (C) are operated to knit the front side of the fabric and wherein needles of the dial (D) are operated to knit the rear side of the fabric, the method comprising the following steps that are carried out several times within a stitch row:

knitting the base yarn on the rear side of the fabric, except for connecting points, where the base yarn is knitted on the front side of the fabric;

inserting the first pattern yarn at a position of 1 to 50 stitches before a start of a pattern unit that is produced using the first pattern yarn and is knitted on the rear side of the fabric before a start of the pattern unit for the abovementioned number of stitches; subsequently knitting the first pattern yarn on the front side of the fabric in the pattern unit;

knitting the first pattern yarn on the rear side of the fabric after the pattern unit for 1 to 50 stitches after an end of the pattern unit; and subsequently cutting off the first pattern yarn.

4. A fabric produced by the method according to claim 1.

5. A double jersey knitted fabric, comprising:
a front side;
a rear side;
a base yarn knitted on the rear side of the fabric, except for connecting points, where the base yarn is knitted on the front side of the fabric; and a pattern yarn inserted before a start of each of several pattern units produced using the pattern yarn;

wherein the pattern yarn is knitted on the front side of the fabric in the pattern unit produced using the pattern yarn; and wherein the pattern yarn is cut off after the pattern unit produced using the pattern yarn.

6. A mattress tick comprising the double jersey knitted fabric according to claim 5.

7. A mattress tick comprising the fabric according to claim 5.

8. A double jersey, double jacquard circular knitting machine, comprising:

a cylinder (C) that rotates in only one direction, and is provided with a needle selector;

a dial (D) provided with a needle selector; and one or more yarn selection mechanisms for the needles on the dial (D);

wherein the circular knitting machine is configured for knitting a double jersey knitted fabric according to claim 5;

wherein each yarn selection mechanism is provided with a yarn-cutting device; and wherein each yarn selection mechanism is configured to perform a yarn change at any position in the double jersey knitted fabric.

9. A double jersey, single jacquard circular knitting machine, comprising:

a cylinder (C) that rotates in only one direction and is provided with a needle selector and a dial (D);

one or more yarn selection mechanisms for needles on the dial;

wherein the circular knitting machine is configured for knitting a double jersey knitted fabric according to claim 5;

wherein each yarn selection mechanism is provided with a yarn-cutting device; and wherein each yarn selection mechanism is configured to perform a yarn change at any position in the double jersey knitted fabric.

* * * * *